US006906744B1

United States Patent
Hoshuyama et al.

(10) Patent No.: US 6,906,744 B1
(45) Date of Patent: Jun. 14, 2005

(54) ELECTRONIC CAMERA

(75) Inventors: Hideo Hoshuyama, Kawasaki (JP);
Tetsuya Takeshita, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/503,917

(22) Filed: Feb. 15, 2000

(30) Foreign Application Priority Data

Sep. 28, 1999 (JP) ............................................. 11-275118
Nov. 9, 1999 (JP) ............................................. 11-318164

(51) Int. Cl.⁷ .............................................. H04N 9/73
(52) U.S. Cl. .................................. 348/223.1; 358/516
(58) Field of Search ......................... 348/223.1–228.1, 348/655, 603, 650, 652, 229.1, 665; 382/164, 190, 194, 293; 358/515–518

(56) References Cited

U.S. PATENT DOCUMENTS

| 5,210,600 A | * | 5/1993 | Hirata | 358/527 |
| 5,485,202 A | * | 1/1996 | Ueda | 348/223.1 |
| 5,541,649 A | * | 7/1996 | Yamamoto et al. | 348/223.1 |
| 5,764,285 A | * | 6/1998 | Ochi et al. | 348/222.1 |
| 5,900,860 A | * | 5/1999 | Ueda | 345/600 |

FOREIGN PATENT DOCUMENTS

JP            06121332 A * 4/1994 ............ H04N/9/64

* cited by examiner

Primary Examiner—Tuan Ho
Assistant Examiner—Yogesh Aggarwa
(74) Attorney, Agent, or Firm—Oliff & Berridge PLC

(57) ABSTRACT

An electronic camera is provided with an image-capturing device for photographing (73, 26) that captures an image of a subject image passed through a taking lens and outputs image data, an image-capturing device for scene analysis (86) that is provided at a position conjugate with the position of the image-capturing device for photographing relative to the taking lens and outputs scene analysis image data by receiving the light of the subject image and a scene detection processing circuit (35) that determines a white balance adjustment gains based upon the scene analysis image data output by the analytical image-capturing device. Using the white balance adjustment gains determined by the scene detection processing circuit, white balance adjustment is performed on the image data output by the image-capturing device for photographing.

24 Claims, 19 Drawing Sheets

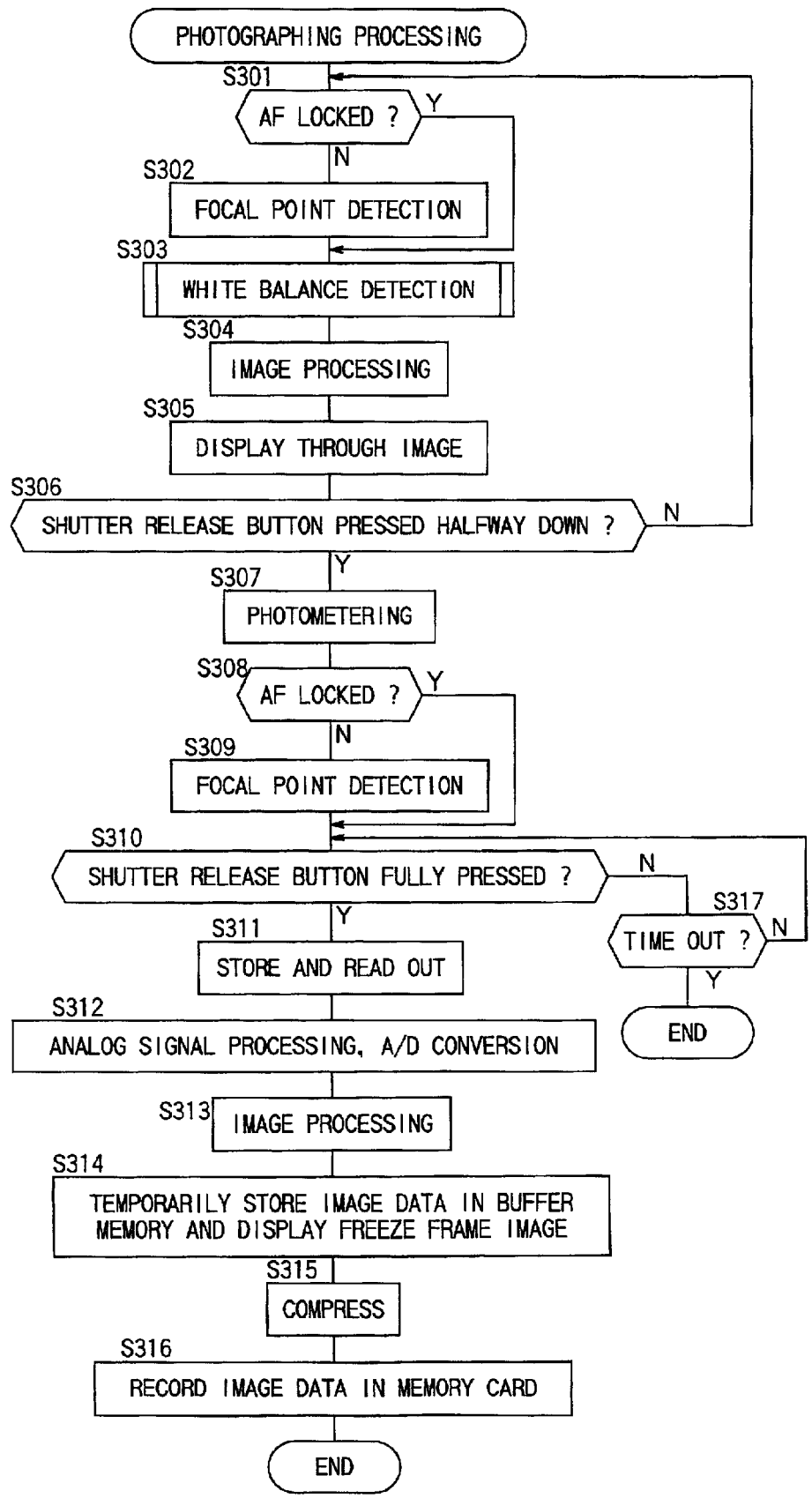

ELECTRONIC CAMERA

INCORPORATION BY REFERENCE

The disclosures of the following priority applications are incorporated herein by reference: Japanese Patent Application No. 11-275118 filed Sep. 28, 1999 Japanese Patent Application No. 11-318164 filed Nov. 9, 1999

BACKGROUND OF THE INVENTION

1. Field of the Invention

The present invention relates to an electronic camera such as a digital still camera that captures an image of a subject and records the captured image as electronic image data.

2. Description of the Related Art

Digital cameras in the known art include those provided with an image-capturing device such as a CCD that captures an image of a subject image passed through the taking lens and outputs image data and an image processing circuit that performs image processing such as white balance adjustment and gamma control by adjusting the amplification gain to be used on the image data output by the image-capturing device. At the image processing circuit, image processing is performed by calculating parameters such as R gain and B gain for white balance adjustment or a gradation curve for gamma control in conformance with a predetermined algorithm based upon the image data output by the image-capturing device.

In such a digital camera in the prior art, color information corresponding to the main subject, the background and the like, the image of which has been captured, is averaged to calculate a white balance adjustment gain that will achieve an achromatic color. Then, white balance adjustment is performed on the image data using the adjustment gain thus calculated. When photographing a person using this camera, the following problems may occur depending upon the composition.

(1) The white balance adjustment value is calculated mainly using color information corresponding to the areas other than the skin-colored portion when the ratio of the area occupied by the skin-colored portion such as a face in the photographic field is small. Therefore, white balance adjustment implemented by using the white balance adjustment gain thus calculated on the skin-colored portion tends to be defective, and defective adjustment may result in a faded image or a tinted image.

(2) When a person is photographed in closeup, as in portrait photographing, an achromatic color is often not achieved by averaging the color information if there are many highly saturated colors such as flowers and greenery in the background. As a result, the white balance adjustment calculated under those circumstances tends to be defective, which may change the hue of the skin color of the person.

SUMMARY OF THE INVENTION

An object of the present invention is to provide an electronic camera that is capable of minimizing the occurrence of the fading/tinting phenomenon in a satisfactory manner by implementing white balance adjustment based upon the results of analysis of the photographic scene.

In order to achieve the object described above, an electronic camera according to the present invention comprises an image-capturing device for photographing that captures an image of a subject image passing through a taking lens and outputs image data, an image-capturing device for scene analysis that is provided at a position that is conjugate with the image-capturing device for photographing relative to the taking lens and receives light from the subject image to output scene analysis image data, a gain calculation unit that calculates gain by using at least either image data corresponding to a large area of the image-capturing device for scene analysis or image data corresponding to a small area at the image-capturing device for scene analysis and a gain adjustment unit that performs gain adjustment by applying the gain calculated at the gain calculation unit to the image data output by the image-capturing device for photographing.

The large area refers to a plurality of first areas obtained by dividing the image-capturing area of the image-capturing device for scene analysis into a unit area including a first specific number of pixels. The small area is constituted of a plurality of second areas achieved by dividing the image-capturing area of the image-capturing device for scene analysis into a unit area including a second specific number of pixels which is smaller than the first specific number. It is desirable that the gain calculation unit calculates gain by selecting image data of either the large area or the small area in correspondence to the type of subject and using the image data in the selected area.

The electronic camera may be further provided with a decision-making unit that makes a decision as to whether or not there is an area having image data that are judged to indicate an achromatic color among the plurality of first areas and further makes a decision as to whether or not there is an area having image data judged to indicate skin color among the plurality of second areas if it is decided that there is no area among the first areas with image data judged to indicate an achromatic color. In this case, if the decision-making unit decides that there is an area having image data that are judged to indicate an achromatic color, the gain calculation unit calculates gain based upon the image data in the area having the image data indicating an achromatic color. If the decision-making unit decides that there is an area having image data that are judged to indicate skin color, the gain calculation unit calculates gain based upon the image data in the area having the image data judged to indicate skin color.

In order to achieve the object described above, another electronic camera according to the present invention comprises the image-capturing device for photographing and the image-capturing device for scene analysis described above, a detection unit that detects an area having image data that are judged to indicate a predetermined color in the image data corresponding to a predetermined area of the image-capturing device for scene analysis, a gain calculation unit that calculates gain based upon the color indicated by the image data in the area detected by the detection unit and a gain adjustment unit that performs gain adjustment by applying the gain calculated by the gain calculation unit to image data output by the image-capturing device for photographing.

The detection unit detects; (1) the presence of an area having image data that are judged to indicate an achromatic color among a plurality of first areas achieved by dividing the image-capturing area of the image-capturing device for scene analysis into a unit area including a first specific number of pixels and (2) the presence of an area having image data that are judged to indicate skin color among a plurality of second areas achieved by dividing the image-capturing area of the image-capturing device for scene analysis into a unit areas including a second specific number of pixels which is smaller than the first specific number. It is desirable that the detection unit performs detection for an area having image data that are judged to indicate skin color if it cannot detect an area having image data that are judged to indicate an achromatic color.

The electronic camera may further comprises a selection unit that selects either a first photographing mode suited to white balance adjustment performed by using an achromatic color or a second photographing mode suited to white balance adjustment performed by using skin color. In this case, the color to be detected by the detection unit is selected in correspondence to the photographing mode selected by the selection unit and a gain is calculated by using image data indicating the selected color.

In an electronic camera provided with a selection unit that selects a landscape photographing mode, if the landscape photographing mode has been selected by the selection unit, the detection unit may detect, at least, an area having image data that are judged to indicate an achromatic color and the gain calculation unit may calculate gain based upon the image data in the area having the image data judged to indicate an achromatic color. In an electronic camera provided with a selection unit that selects a portrait photographing mode, if the portrait photographing mode has been selected by the selection unit, the detection unit may detect, at least, an area having image data that are judged to indicate skin color and the gain calculation unit may calculate gain based upon the image data in the area having the image data judged to indicate skin color.

In order to achieve the object described above, yet another electronic camera according to the present invention comprises the image-capturing device for photographing and the image-capturing device for scene analysis described earlier, a conversion unit that converts image data in a predetermined area of the image-capturing device for scene analysis to color data in either a first color-related coordinate system or a second color-related coordinate system, a gain calculation unit that calculates gain based upon the color data resulting from the conversion performed by the conversion unit and a gain adjustment unit that performs gain adjustment by applying the gain calculated at the gain calculation unit to the image data output by the image-capturing device for photographing.

The conversion unit converts; (1) image data in a plurality of first areas achieved by dividing the image-capturing area of the image-capturing device for scene analysis into a unit area including a first specific number of pixels to color data in the first coordinate system and (2) image data in a plurality of second areas achieved by dividing the image-capturing area of the image-capturing device for scene analysis into a unit area including a second specific number of pixels that is smaller than the first specific number to color data in the second coordinate system.

The electronic camera may further comprise with a selection unit that selects either a first photographing mode suited to white balance adjustment performed by using an achromatic color or a second photographing mode suited to white balance adjustment performed by using skin color. In this case, the conversion unit converts image data in a predetermined area of the image-capturing device for scene analysis to color data in the first coordinate system or the second coordinate system in correspondence to the photographing mode selected by the selection unit.

In an electronic camera provided with a selection unit that selects a landscape photographing mode, if the landscape photographing mode has been selected by the selection unit, the conversion unit converts the image data in the predetermined area of the image-capturing device for scene analysis to color data in the first coordinate system. In an electronic camera provided with a selection unit that selects a portrait photographing mode, if the portrait photographing mode has been selected by the selection unit, the conversion unit converts the image data in the predetermined area of the image-capturing device for scene analysis to color data in the second coordinate system.

Furthermore, in order to achieve the object described above, an electronic camera according to the present invention comprises the image-capturing device for photographing and the image-capturing device for scene analysis described above, a conversion unit that converts image data in a plurality of first areas achieved by dividing the image-capturing area of the image-capturing device for scene analysis into a unit area including a first specific number of pixels to color data in a first color-related coordinate system or converts image data in a plurality of second areas achieved by dividing the image-capturing area of the image-capturing device for scene analysis into a unit area including a second specific number of pixels that is smaller than the first specific number to color data in a second color-related coordinate system, a gain calculation unit that calculates gain using the color data in the first coordinate system or the second coordinate system resulting from the conversion performed by the conversion unit and a gain adjustment unit that performs gain adjustment by applying the gain calculated by the gain calculation unit to the image data output by the image-capturing device for photographing.

The electronic camera may further comprise with a selection unit that selects either a first photographing mode suited to white balance adjustment performed by using an achromatic color or a second photographing mode suited to white balance adjustment performed by using skin color. In this case, the conversion unit converts scene-analysis image data to color data in the first coordinate or the second coordinate system in correspondence to the photographing mode selected by the selection unit.

In an electronic camera provided with a selection unit that selects a landscape photographing mode, if the landscape photographing mode has been selected by the selection unit, the conversion unit converts scene-analysis image data to color data in the first coordinate system. In an electronic camera provided with a selection unit that selects a portrait photographing mode, if the portrait photographing mode has been selected by the selection unit, the conversion unit converts scene-analysis image data to color data in the second coordinate system.

Another object of the present invention is to provide an electronic camera capable of performing white balance adjustment by detecting the skin color of the main subject from a predetermined image area such as a focal point detection area to maintain a natural hue skin color of the person.

In order to achieve the object described above, an electronic camera according to the present invention comprises an image-capturing device that captures an image of a subject image passing through a taking lens and outputs image data, a color temperature detection unit that is provided at a position conjugate with the image-capturing device relative to the taking lens and receives light of the subject image to detect color temperature information, a gain calculation unit that detects skin color based on the color temperature information detected by the color temperature detection unit for a predetermined area in the photographic field and calculates gain using the skin color and a gain adjustment unit that performs gain adjustment by applying the gain calculated at the gain calculation unit to the image data output by the image-capturing device.

This electronic camera may be provided with a focal point detection unit that detects the focal adjustment state of the taking lens in a plurality of areas within the photographic field, a focal point detection area selection unit that selects a detection area in which detection is performed by the focal point detection unit among a plurality of areas and a lens drive unit that drives the taking lens to the focus position based upon the focal adjustment state detected by the focal point detection unit. In addition, in this electronic camera, the gain calculation unit may detect skin color based on the color temperature information detected by the color temperature detection unit for the detection area selected by the focal point detection area selection unit to calculate gain using the skin color. The gain calculation unit may also calculate gain using the skin color that has been detected at a point in time at which the lens drive unit has completed the focal adjustment drive and the gain adjustment unit may perform gain adjustment by applying this gain to the image data output by the image-capturing device.

In addition, in an electronic camera provided with a photometering unit that detects the brightness level of the subject image in a plurality of areas in the photographic field and a photometering area selection unit that selects a photometering area where a photometering operation is to be performed by the photometering unit among the plurality of areas, the gain calculation unit may detect skin color based on color temperature detected by the color temperature information detection unit for the photometering area selected by the photometering area selection unit to calculate the gain using the skin color. It is desirable that the gain calculation unit calculates gain based upon a predetermined color if skin color cannot be detected.

BRIEF DESCRIPTION OF THE DRAWINGS

FIG. 20 is a flowchart of the photographing processing.

DESCRIPTION OF THE PREFERRED EMBODIMENTS

The following is an explanation of preferred embodiments of the present invention, given in reference to the drawings.

First Embodiment

Figure 1:
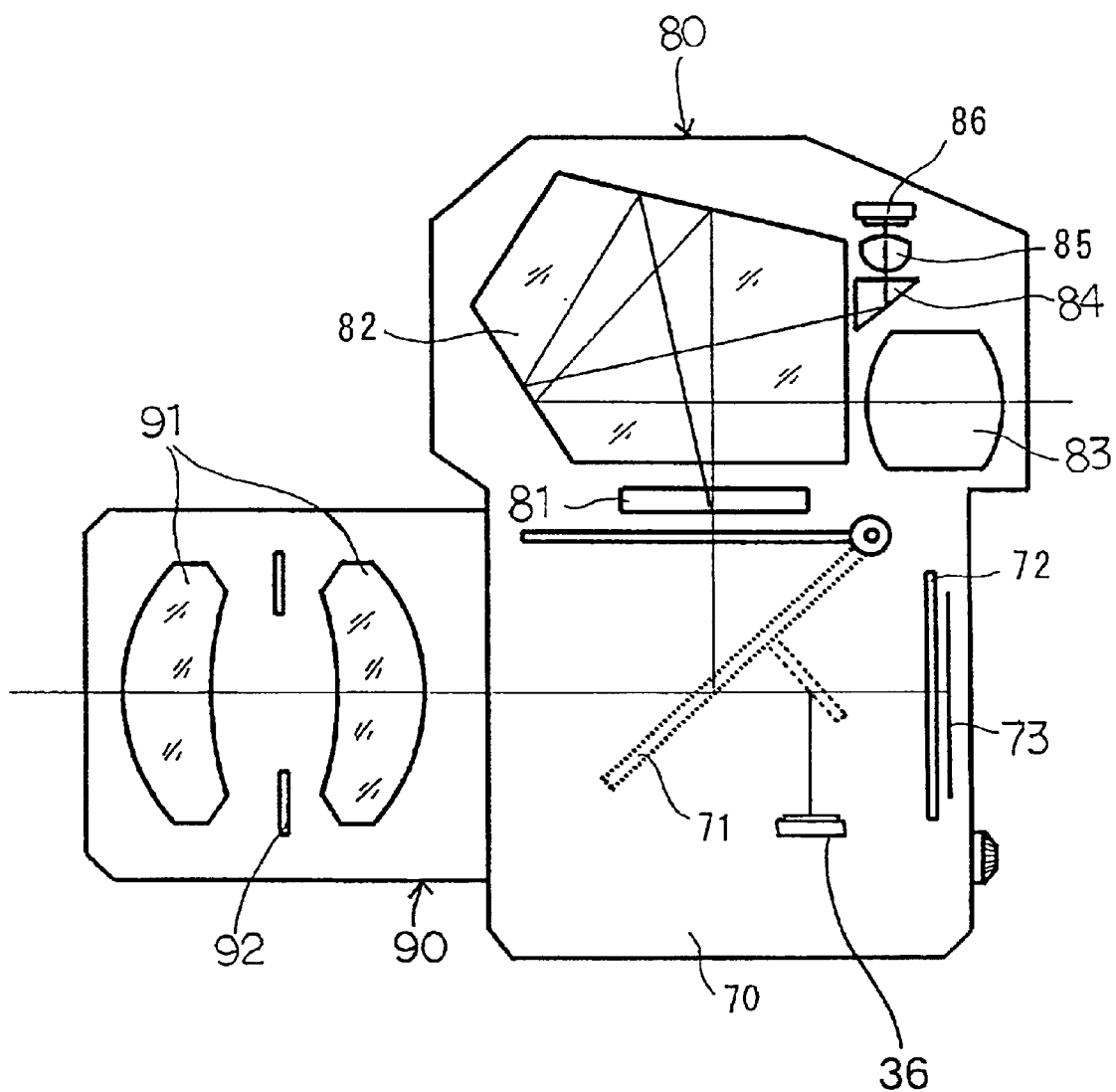
FIG. 1 illustrates the structure adopted in a first embodiment of a single lens reflex digital still camera.

As illustrated in FIG. 1, the single lens reflex digital still camera in this embodiment comprises a camera main body 70, a finder device 80 that is detachably mounted at the camera main body 70 and an interchangeable zoom lens 90 that is internally provided with a lens 91 and an aperture 92 and is detachably mounted at the camera main body 70. Subject light that enters the camera main body 70 through the interchangeable zoom lens 90 is guided to the finder device 80 by a quick-return mirror 71 located at the position indicated by the dotted line in a pre-release state to form an image at a finder mat 81 and also form an image at a focal point detection device 36. The subject light that forms an image at the finder mat 81 is further guided to an eyepiece lens 83 by a pentaprism 82. In addition, in a pre-release state, the subject light travels through a prism 84 and an image-forming lens 85 and enters an image-capturing device for scene analysis 86 to form an image of the subject. After a shutter release, the quick-return mirror 71 rotates to the position indicated by the solid line and the subject light forms an image on an image-capturing device for photographing 73 via a shutter 72. The image-capturing device for scene analysis 86 is provided at a position which is conjugate with the image-capturing device for photographing 73 relative to the taking lens 91.

Figure 2:
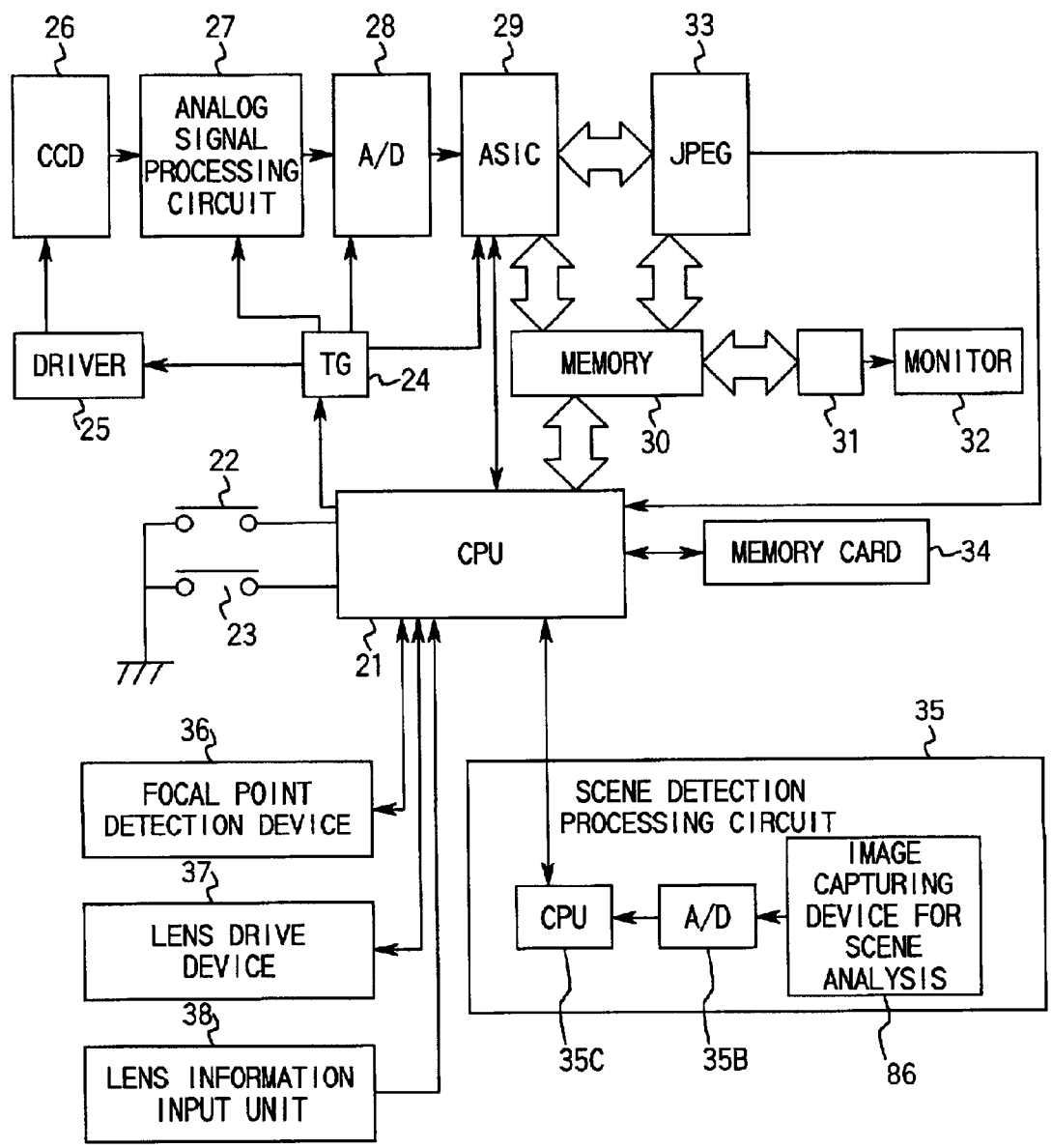
FIG. 2 is a block diagram illustrating the signal processing system in the single lens reflex digital still camera in the first embodiment.

FIG. 2 is a block diagram of the circuit adopted in an embodiment of the digital camera according to the present invention. A halfway press signal and a full press signal respectively output from a halfway press switch 22 and a full press switch 23 that interlock with a shutter release button are input to a CPU 21. When the halfway press switch 22 is operated and a halfway press signal is input, the focal point detection device 36 detects the focal adjustment state of the interchangeable zoom lens 90 in response to a command issued by the CPU 21, and a lens drive device 37 drives the taking lens 91 to the focus position so that the subject light entering the interchangeable zoom lens 90 forms an image on the image-capturing device for photographing 73, i.e., an image-capturing device 26 in FIG. 2. Lens information such as the aperture value of the interchangeable zoom lens 90 is input to the CPU 21 via a lens information input unit 38. The CPU 21 implements drive control on the image-capturing device 26 via a timing generator 24 and a driver 25. The image-capturing device 26 may be constituted of, for instance, a CCD and hereafter, the explanation is given on the assumption that the image-capturing device is a CCD. The timing generator 24 controls the operating timing of an analog signal processing circuit 27 and an A/D conversion circuit 28.

In succession to the ON operation of the halfway press switch 22, the full press switch 23 is turned ON to swing the quick-return mirror 71 upward and, as a result, the subject light from the interchangeable zoom lens 90 forms an image on the light-receiving surface of the CCD 26 to store the signal charges corresponding to the brightness of the subject image at the CCD 26. The signal charges stored at the CCD 26 are cleared by the driver 25 and are input to the analog signal processing circuit 27 which includes an AGC circuit and a CDS circuit. After analog processing such as gain control and noise removal is performed on the analog image signal at the analog signal processing circuit 27, the image signal is converted to a digital signal at the A/D conversion circuit 28. The signal thus digitized is inputted to an image processing circuit 29 which may be constituted as, for instance, an ASIC, where image pre-treatments such as white balance adjustment, profile compensation and gamma control, which are to be detailed later, are implemented.

The image data having undergone the image pre-treatments further undergo interpolation processing and format processing for JPEG compression (image post-treatment), and the image data having undergone the format processing are temporarily stored in a buffer memory 30.

A display image preparation circuit 31 processes the image data stored in the buffer memory 30 to produce display image data which are then displayed at an external monitor 32 such as an LCD as the photographing results. In addition, the image data stored in the buffer memory 30 undergo data compression at a compression circuit 33 at a certain rate through the JPEG format, and are recorded in a recording medium (memory card) 34 such as a flash memory via an interface (not shown).

Figure 3:
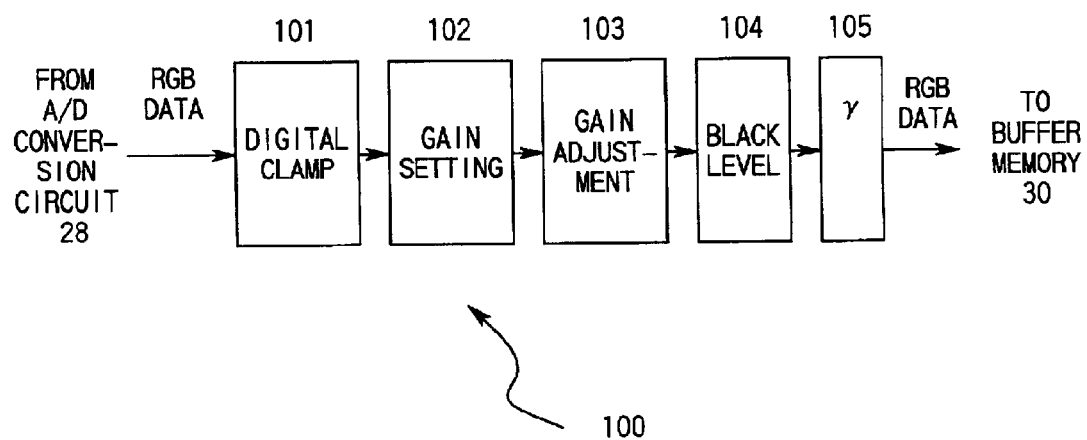
FIG. 3 is a block diagram illustrating the circuit engaged in line processing in the signal processing system in FIG. 2.

FIG. 3 illustrates a line processing circuit 100 that performs signal processing on the image data from the CCD 26 in units of individual lines. This line processing circuit 100 is provided at the image processing circuit 29 to perform image pre-treatment. The line processing circuit 100 performs various types of signal processing which are to be detailed later on 12-bit R, G and B signals output by the A/D conversion circuit 28, and is provided with a digital clamp circuit 101, a gain setting circuit 102, a gain adjustment circuit 103, a black level circuit 104 and a gamma control circuit 105.

After the data from any pixel with a defect (its address is identified in advance and set in the register) are corrected, in units of individual lines of the output from the CCD 26 and in point sequence, the 12-bit R, G and B signals output by the A/D conversion circuit 28 are input to the digital clamp circuit 101. The digital clamp circuit 101 subtracts the weighted average of a plurality of sets of pixel data used as optical black from the individual sets of pixel data in each line in the output from the CCD 26 in point sequence and in units of single lines.

The gain setting circuit 102 sets adjustment gains for pixel data in R, G and B colors. The adjustment gains are set by ensuring that gains provided for the pixel data in the individual colors output by the CCD 26 will allow the output levels corresponding to the individual colors to achieve predetermined levels. Even when the output levels of the pixel data output by the different CCDs 26 vary due to inconsistency among the individual CCD units 26, by setting the adjustment gains, the image data levels input to the gain adjustment circuit 103 are corrected to achieve the predetermined levels regardless of inconsistency among individual CCD units 26. The gain adjustment circuit 103 performs white balance adjustment on pixel data in R and B colors that have been input by reading out white balance adjustment R gains and B gains calculated by a scene detection processing circuit 35, which is to be detailed later, and stored in the memory inside the CPU 21 and applying the adjustment gains thus read out to the R and B signals.

The black level circuit 104 adds a predetermined value stored in the register of the CPU 21 to the R, G and B signals in the output from the CCD 26 in point sequence and in units of individual lines. The-gamma control circuit 105 performs gamma control on the output from the CCD 26 by using a gradation look-up table in point sequence and in units of individual lines.

White Balance Detection

The white balance detection processing performed by the scene detection processing circuit 35 in FIG. 2 is now explained in detail. The scene detecting processing circuit 35 comprises an image-capturing device for scene analysis 86, an A/D conversion circuit 35 B that converts an analog signal from the image-capturing device for scene analysis 86 to a digital signal and a CPU 35 C that generates a white balance adjustments gain based upon the digitized signal. The CPU 35 C determines a white balance adjustment gain by analyzing the photographed scene and detecting the white balance for it based upon the digital data resulting from image-capturing performed by the image-capturing device for scene analysis 86. The scene analysis in this context refers to, for instance, an analysis of the distribution state of R, G and B signals in a photographed scene.

Figure 4:
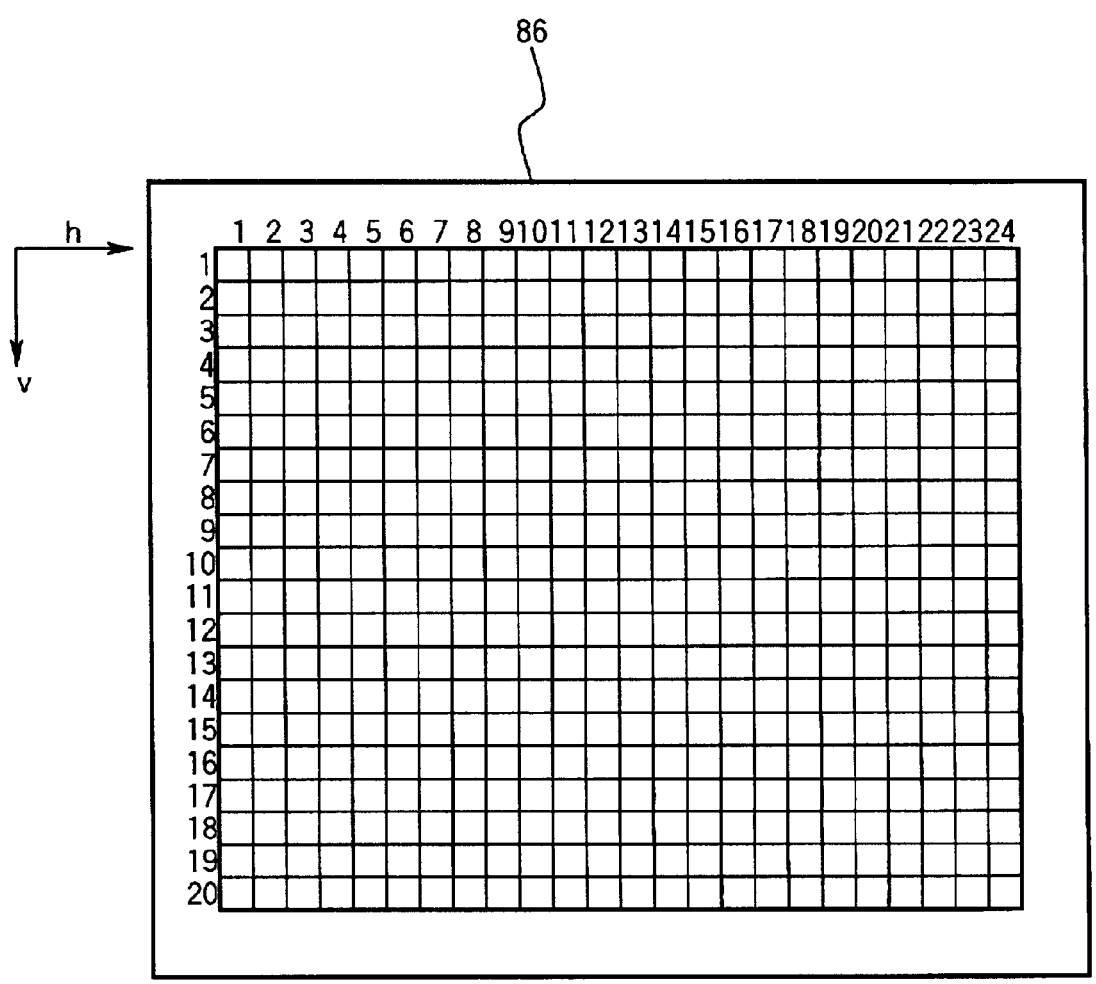
FIG. 4 illustrates the arrangement of pixels adopted at the image-capturing device for scene analysis.
Figure 5:
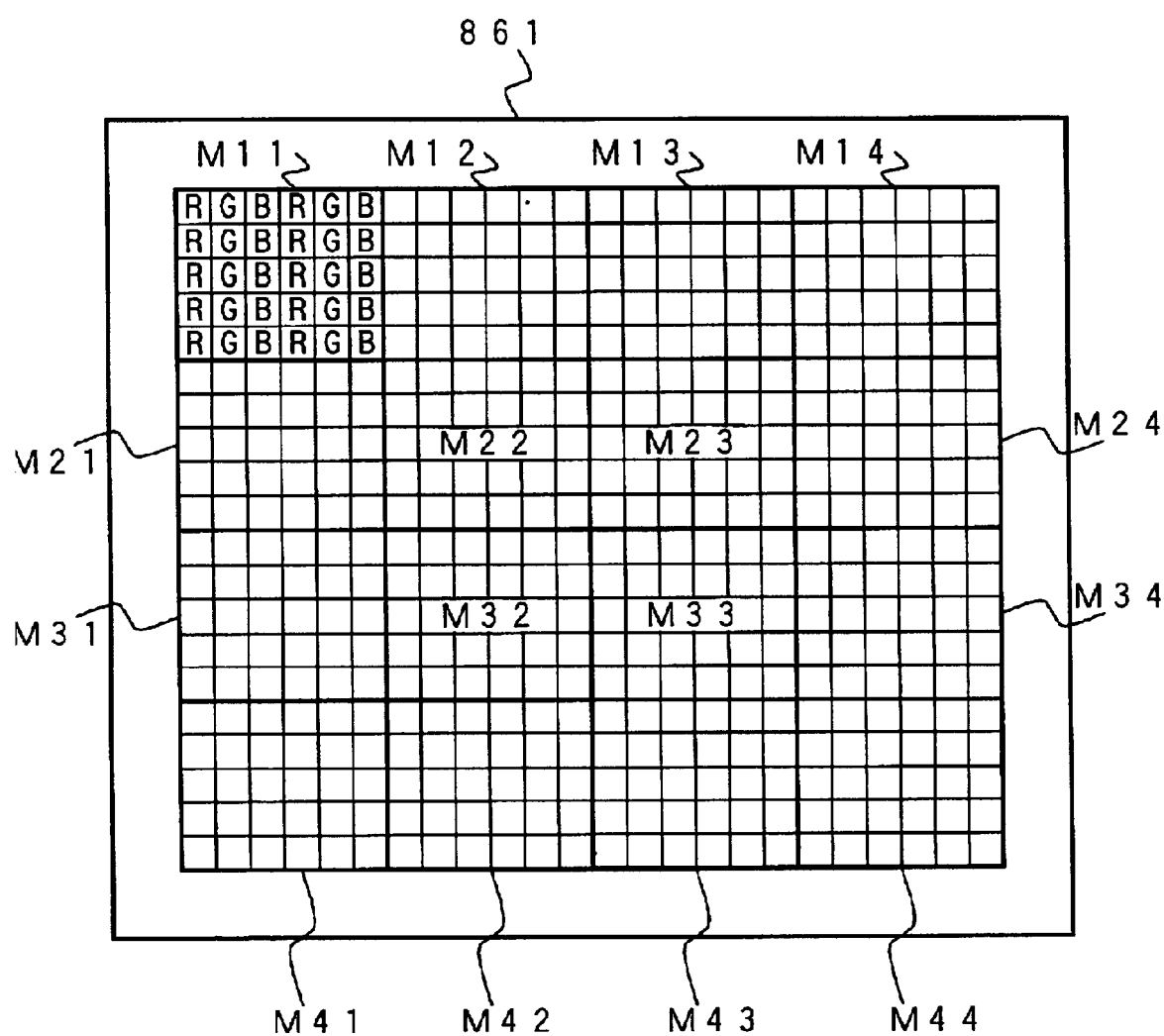
FIG. 5 illustrates the arrangement of color filters and the division into middle-sized areas on the image-capturing device in FIG. 4.
Figure 6:
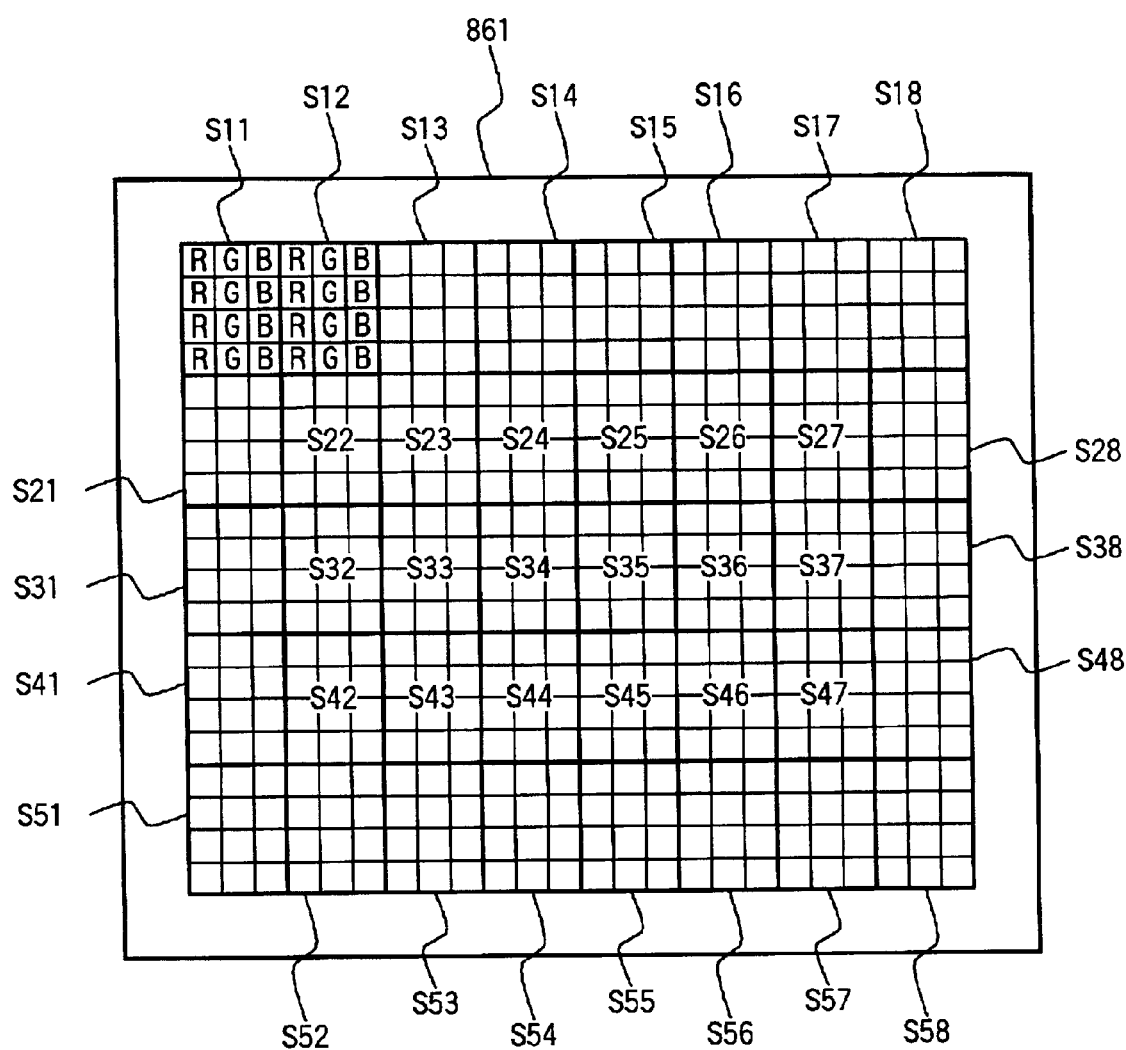
FIG. 6 illustrates the division into small areas implemented on the image-capturing device in FIG. 4.

The image-capturing device for scene analysis 86 may be constituted of a single two-dimensional CCD having 480 pixels arrayed in 24 columns (across)×20 rows (down) as illustrated in FIG. 4. At the surface of the image-capturing device for scene analysis 86, an RGB color filter 861 divided into 480 blocks constituted of 24 columns (across)×20 rows (down) in correspondence to the 480 pixels is provided as illustrated in FIG. 5. The RGB filter constituted of the 480 blocks is grouped into 16 middle-sized area blocks M11, M12, . . . M43 and M44, each having 6 columns (across)×5 rows (down) of filter elements to be utilized for a first scene analysis, as shown in FIG. 5. In addition, the RGB filter constituted of the 480 blocks is grouped into forty small area blocks S11, S12, . . . S57 and S58 each having 3 columns (across)×4 rows (down) of filter elements, to be utilized for a second scene analysis, as shown in FIG. 6.

In the first scene analysis, a detection for color without hue, i.e., an achromatic color in the image data output by the image-capturing device 86 is performed for each of the 16 blocks resulting from the division illustrated in FIG. 5. When the photographic field is divided into roughly 16 middle-size area blocks, it is highly likely that a plurality of colors belonging to the subject are present in a given block. Thus, based upon the principle that the value achieved by averaging the RGB color data corresponding to a plurality of different colors present in a given block, indicates an achromatic color, a detection for an achromatic color is performed by averaging data in R, G and B colors present within each block in the first scene analysis. Since 10 sets of data are available in correspondence to each of the R, G and B colors in each block Mnm among the 16 blocks resulting from the division, average values RM(m, n), GM(m, n) and BM(m, n) are calculated for each block Mmn through the following formulae (1) through (3).

$$RM(m, n) = \frac{\sum_{k=1}^{10} Rk}{10} \quad (1)$$

$$GM(m, n) = \frac{\sum_{k=1}^{10} Gk}{10} \quad (2)$$

$$BM(m, n) = \frac{\sum_{k=1}^{10} Bk}{10} \quad (3)$$

with m representing an integer in the range of 1 through 4, and n representing an integer in the range of 1 through 4. In the formula above, RM(m, n) represents the average value among the 10 sets of R data in a given middle-size area block Mmn, GM(m, n) represents the average value among the 10 sets of G data in the middle-size area block Mmn and BM(m, n) represents the average value among the 10 sets of B data in the middle-size area block Mmn.

Using the average values of the R, G and B color data calculated for each of the 16 blocks, the data corresponding to the three primary colors R, G and B are converted to data in the TC-Duv coordinates in conformance to JIS Z 8725 "Method of measuring a light source temperature and color temperature-correlated color temperature distribution." When the color temperatures (TC) corresponding to the 16 sets of data converted onto the TC-Duv coordinates are plotted, data whose value along the Duv axis is within the range of, for instance, ±10 are determined to represent an achromatic color and data whose value along the Duv axis is outside the ±10 range are determined to represent a chromatic color. If there are any data with a color temperature value judged to be achromatic among the 16 sets of data as a result of the first scene analysis, the color temperature indicated by the set of data is referenced in the relationships between the color temperature and the white balance adjustment gains predetermined as shown in FIG. 7 to ascertain the corresponding white balance adjustment R gain for the R data and the corresponding white balance adjustment B gain for the B data.

Figure 7:
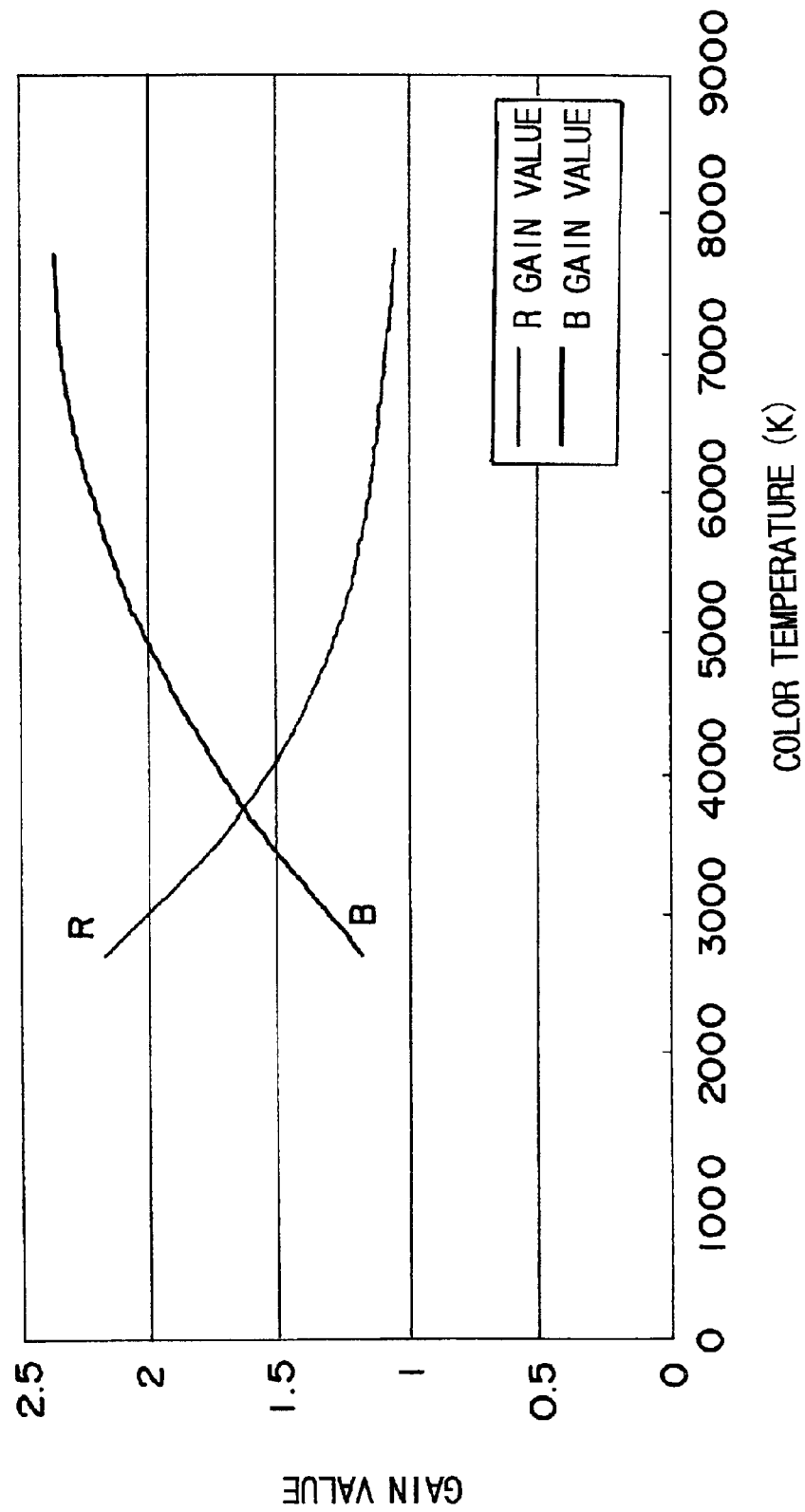
FIG. 7 is a graph illustrating the relationship between the color temperature and the white balance adjustment gain.

The R gain and B gain values in FIG. 7 are the values determined in advance through actual measurement and expressed as functions of the color temperature so as to set the values along the Duv axis of the data plotted on the TC-Duv coordinates to 0, i.e., so as to set the data judged to be achromatic even closer to the actual achromatic color. These R gain and B gain values are stored in the storage area of the CPU 35 C as a look-up table and are read out in correspondence to a specific color temperature.

It is to be noted that if a plurality of sets of data among the 16 sets of data corresponding to the individual blocks are judged to be an achromatic color, the average value of the color temperatures of all the data judged to be an achromatic color is calculated and the color temperature average value thus calculated is referenced in the relationships between the color temperature and the white balance adjustment gains in FIG. 7 to ascertain the corresponding R gain and B gain. If, on the other hand, no set of data among the 16 sets of data corresponding to the individual blocks is judged to be an achromatic color, white balance adjustment gains are not set through the first scene analysis.

In the second scene analysis, a detection for a specific color, e.g., skin color, in the image data output by the image-capturing device 86 is performed for each of the forty blocks resulting from the division shown in FIG. 6. When the photographic field is divided into roughly forty small area blocks, it is highly likely that only one subject color is present in a given block. Thus, in the second scene analysis, a specific color present in the individual blocks is detected. More specifically, in this embodiment, the color of a person's face, i.e., skin color, is detected. Since four sets of data are present for each of the R, G and B colors in a given block Sij resulting from the division, average values RS(i, j), GS(i, j) and BS(i, j) of the individual color data are calculated for each block Sij using the following formulae (4) through (6)

$$RsM(i, j) = \frac{\sum_{k=1}^{4} Rk}{4} \quad (4)$$

$$GsM(i, j) = \frac{\sum_{k=1}^{4} Gk}{4} \quad (5)$$

$$BsM(i, j) = \frac{\sum_{k=1}^{4} Bk}{4} \quad (6)$$

with i representing an integer within the range of 1 through 5 and j representing an integer within the range of 1 through 5.

In the formulae above, RS(i, j) represents the average value of the four sets of R data belonging in a given small area block Sij, GS(i, j) represents the average value of the four sets of G data belonging in the small area block Sij and BS(i, j) representing the average value of the four sets of B data belonging in the small area block Sij.

Figure 8:
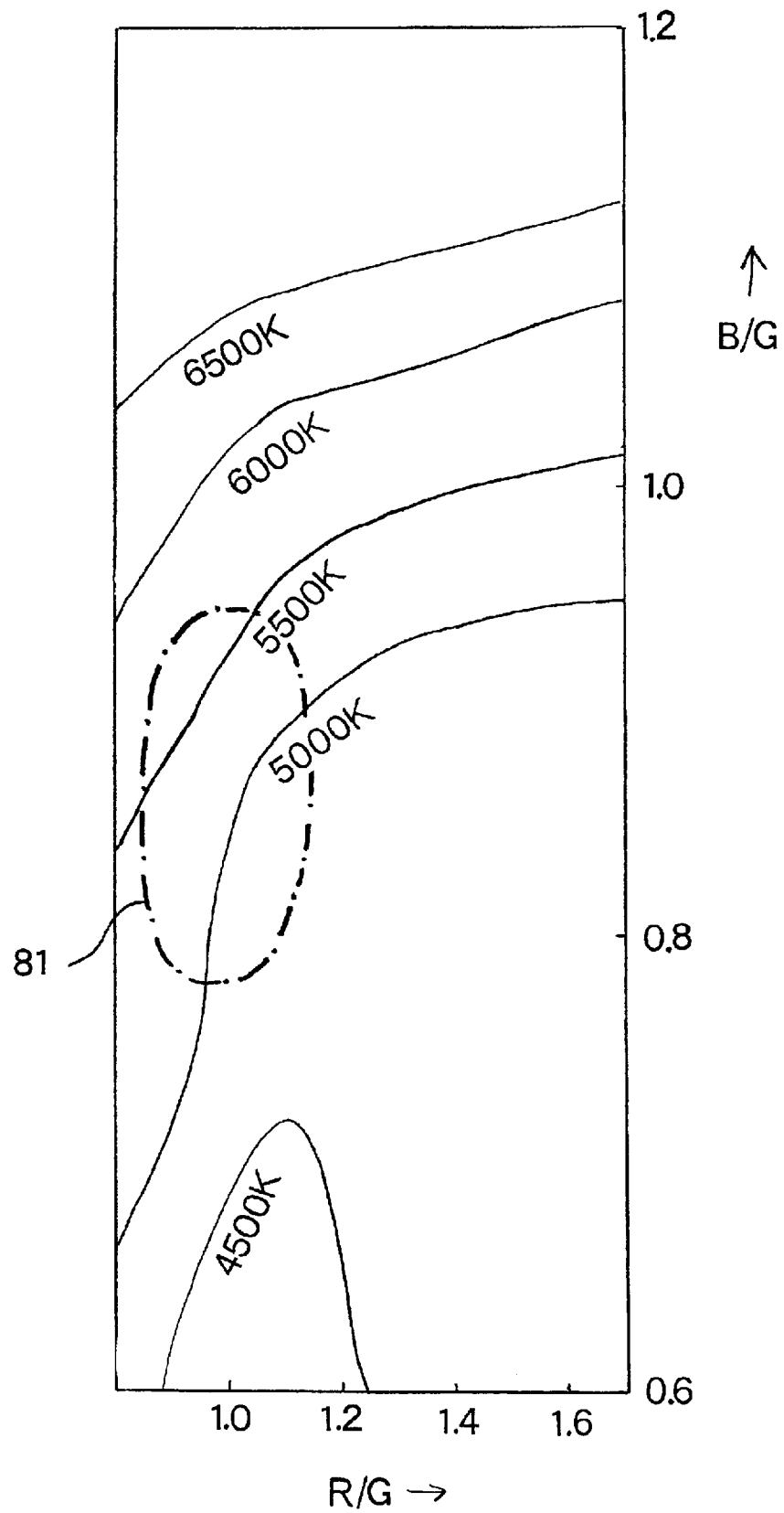
FIG. 8 presents color temperature curves on the R/G-B/G coordinates.

Using the average values of the R, G and B color data calculated for each of the forty blocks, the ratio of the R data and the G data and the ratio of the B data and the G data are calculated and are converted to data in the R/G-B/G coordinates, as shown in FIG. 8. R/G is calculated as "formula (4)/formula (5)" and B/G is calculated as "formula (6)/formula (5)". FIG. 8 shows color temperature curves presented in the R/G-B/G coordinates. FIG. 8 indicates that the color temperature is low in the lower left area where the color temperature is under 4500 K and it rises in the upper areas, exceeding 6500 K in the uppermost area. An area 81 enclosed by the one-point chain line in FIG. 8 indicates a skin color area to be detected in the second scene analysis. It is to be noted that the color temperature curves in FIG. 8 are stored in the storage area of the CPU 35 C as a look-up table and a color temperature value is read out in correspondence to specific ratios R/G and B/G.

Figure 9:
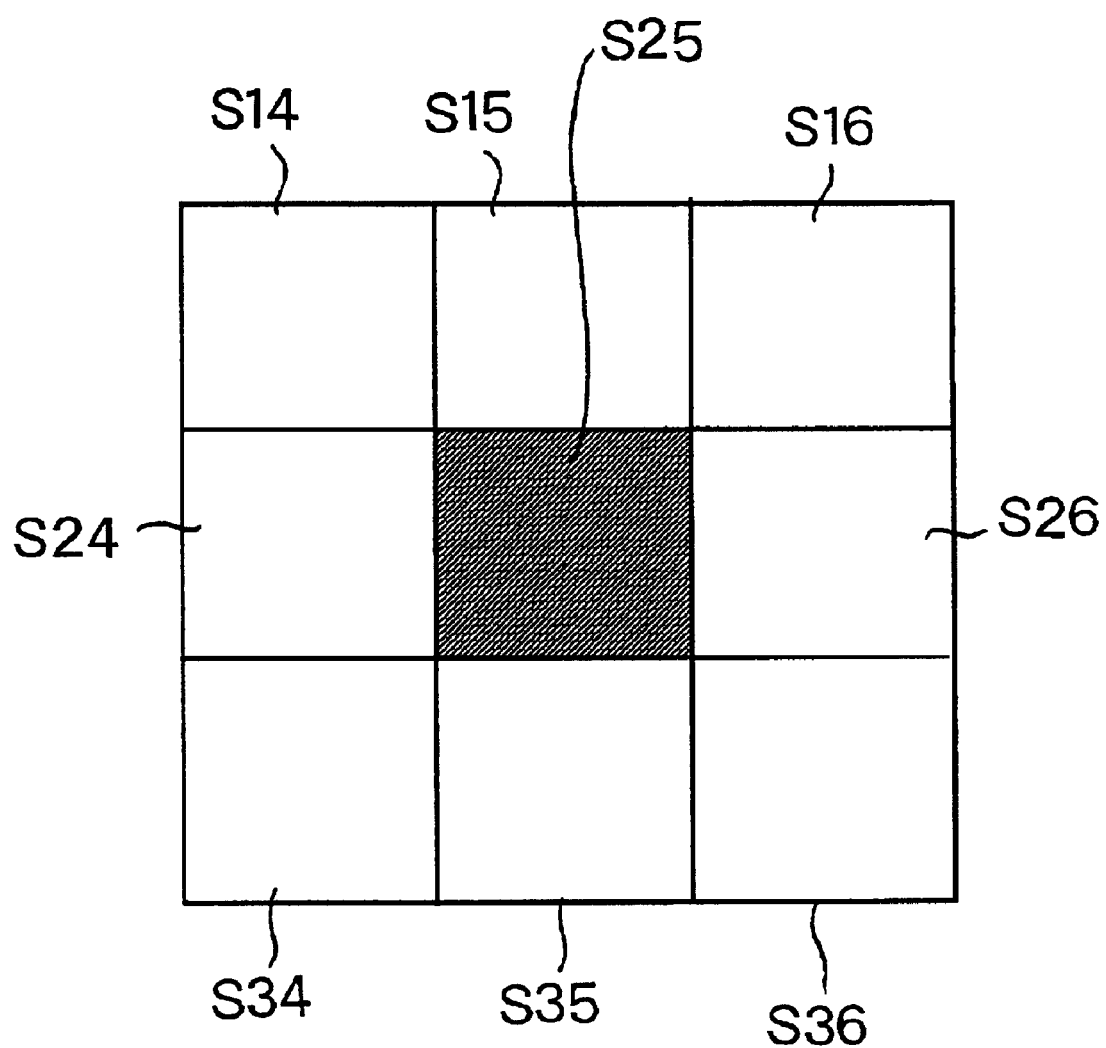
FIG. 9 illustrates the group decision-making.

When forty sets of data are plotted on the R/G-B/G coordinates based upon the ratios R/G and B/G of the average values of the R, G and B color data calculated for the forty individual blocks, the data corresponding to the area 81 are judged to indicate skin color and data outside the area 81 are judged to indicate non-skin color. If there is any set of data among the forty sets of data that is judged to indicate skin color as a result of the second scene analysis, group decision-making is implemented to decide as to whether or not skin color is detected in the area surrounding the area having been detected to indicate skin color. For instance, if skin color is detected in the small area S25 in FIG. 6, skin color decision-making is performed for a total of eight areas, i.e., areas S14 through S16, areas S24 and S26 and areas S34 through S36, as shown in FIG. 9. If, for instance, skin color is detected in three or more areas among the eight areas surrounding the area S25, the data of the area S25 are stored as skin color data. If, on the other hand, skin color is detected in two or fewer areas among the eight surrounding areas, the data of the area S25 are regarded as isolated data and are not stored as skin color data.

If there are a plurality of areas the data of which are stored as skin color data, such as the area S25, the average value of the color temperatures individually determined by using the color temperature curves in FIG. 8 for those areas Sij is calculated. The color temperature average value thus calculated is referenced in the relationships between the color temperature and the white balance adjustment gains shown in FIG. 7 to ascertain the corresponding white balance adjustment R gain for the R data and the corresponding white balance adjustment B gain for the B data. If there is only one area, such as S25, with its data stored as skin color data, the color temperature ascertained for the area is directly referred in the relationships shown in FIG. 7 to determine the corresponding R gain and B gain for white balance adjustment. If there is no area with image data stored as skin color data among the forty blocks, white balance adjustment gains are not set through the second scene analysis.

If no white balance adjustment gains are determined in the first scene analysis or the second scene analysis described above, the color temperature value 5500K, which is recorded in the memory in the CPU 35C as the default value is read out. By referencing this value 5500K in the relationships in FIG. 7, default white balance adjustments gains R gain and B gain are determined.

The gain adjustment values R gain and B gain determined as described above are temporarily stored in the register at the CPU 21 as white balance adjustment values. When white balance adjustment is performed on R and B color pixel data input to the gain adjustment circuit 103, the gain adjustment circuit 103 reads out the R gain and B gain stored within the CPU 21 to apply them to the R and B signals respectively.

Figure 10:
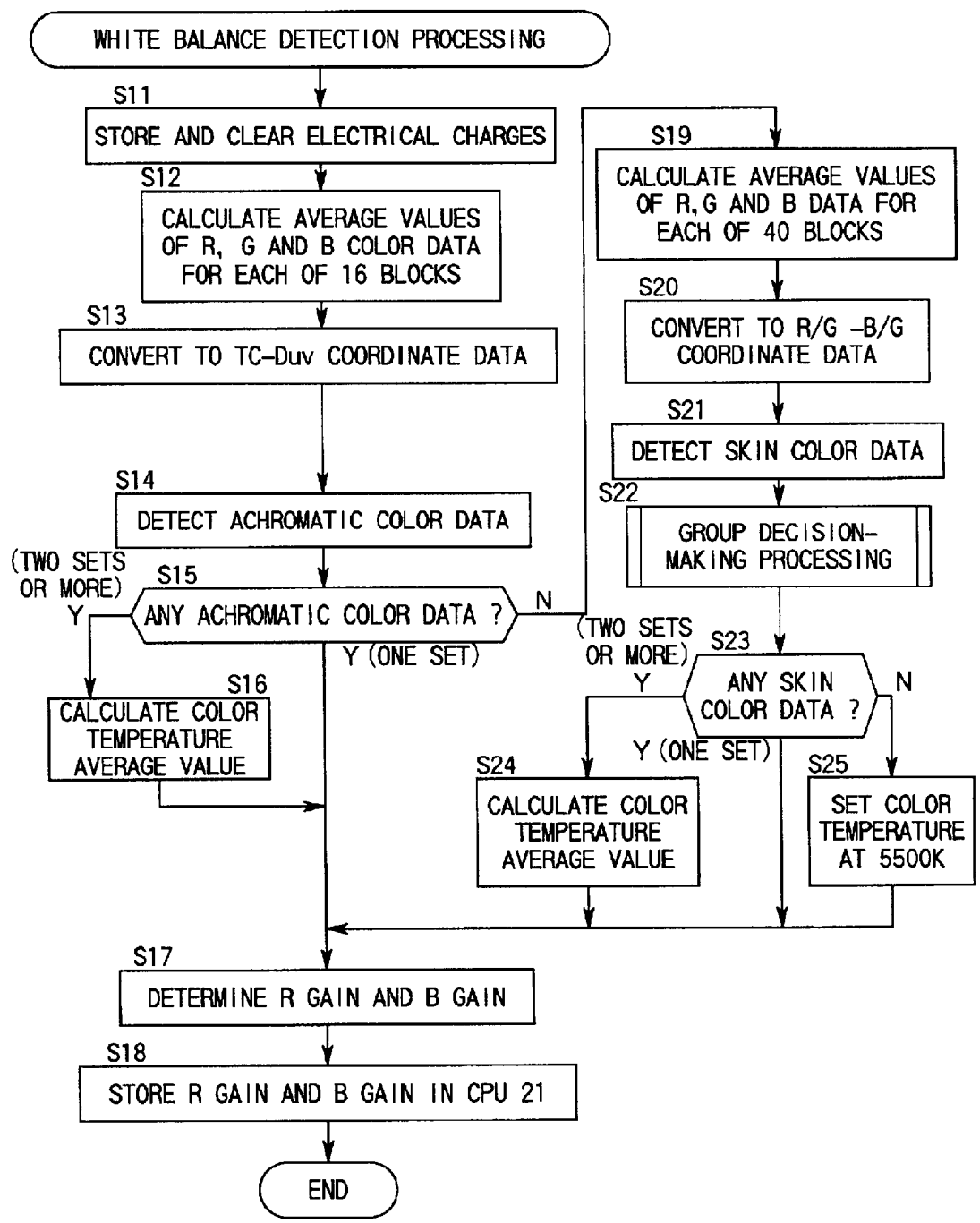
FIG. 10 is a flowchart of the white balance detection processing

The white balance detection processing described above is now explained in reference to the flowchart in FIG. 10. The white balance detection processing is repeatedly performed over specific intervals while the power of the digital still camera remains ON. In step S11, the signal charges are stored at the image-capturing device for scene analysis 86, the stored charges are cleared and converted to digital data at the A/D conversion circuit 35B and then are taken into the CPU 35C. In step S12, the data taken into the CPU 35C are divided into 16 middle-size area blocks, and the average values of data in R, G and B colors present in each of the divided blocks are calculated. In step S13, the 16 sets of RGB data are transformed into TC-Duv coordinate data and in step S14, detection for achromatic color data in the data having undergone the coordinate transformation is performed.

In step S15, a decision is made as to whether or not any achromatic color data have been detected, and if it is decided that two or more sets of achromatic color data have been detected (step S15; Y (two or more)), the operation proceeds to step S16 to calculate the average value of the color temperatures of the detected achromatic color data before proceeding to step S17. If it is decided in step S15 that there is one set of achromatic color data (step S15; Y (one)) the color temperature of this set of achromatic color data is carried over to step S17. The operation performed in steps S12 through S15 described above constitutes the first scene analysis processing.

If, on the other hand, it is decided in step S15 that no achromatic color data have been detected (step S15; N), the second scene analysis in step S19 and subsequent steps is implemented. In step S19, the data taken into the CPU 35C in step S11 is divided into forty small area blocks, and the average values of the data in R, G and B colors present in each divided block are calculated. In step S20, the forty sets of RGB data are converted to R/G-B/G coordinate data, and in step S21, detection for skin color data in the data having undergone the coordinate transformation is performed.

In step S22, group decision-making processing, in which skin color data detected in a small area block are judged to be true skin color data only when skin color is detected in at least a specific number of small area blocks among the eight small area blocks surrounding the small area block where skin color is first detected, is performed. Based upon the results of the group decision-making processing, a decision is made in step S23 as to whether or not there is any set of skin color data that has been judged to be true skin color data, and if it is decided that there are two or more sets of skin color data (step S23; Y (two or more)), the operation proceeds to step S24 to calculate the average value of the color temperatures ascertained in correspondence to the detected skin color data before proceeding to step S17. If it is decided in step S23 that there is one set of skin color data (step S23; Y (one)), the color temperature corresponding to this set of skin color data is carried over to step S17. If it is decided in step S23 that there is no set of skin color data (step S23; N), the operation proceeds to step S25 to read out the color temperature value 5500K which is stored in the CPU 35C as a default value before proceeding to step S17.

In step S17, the white balance adjustment R gain and B gain are read out from the look-up table stored in the storage area of the CPU 35C in correspondence to the color temperature. When the R gain and B gain values thus read out are stored in the CPU 21 in step S18, the processing in FIG. 10 ends.

Figure 11:
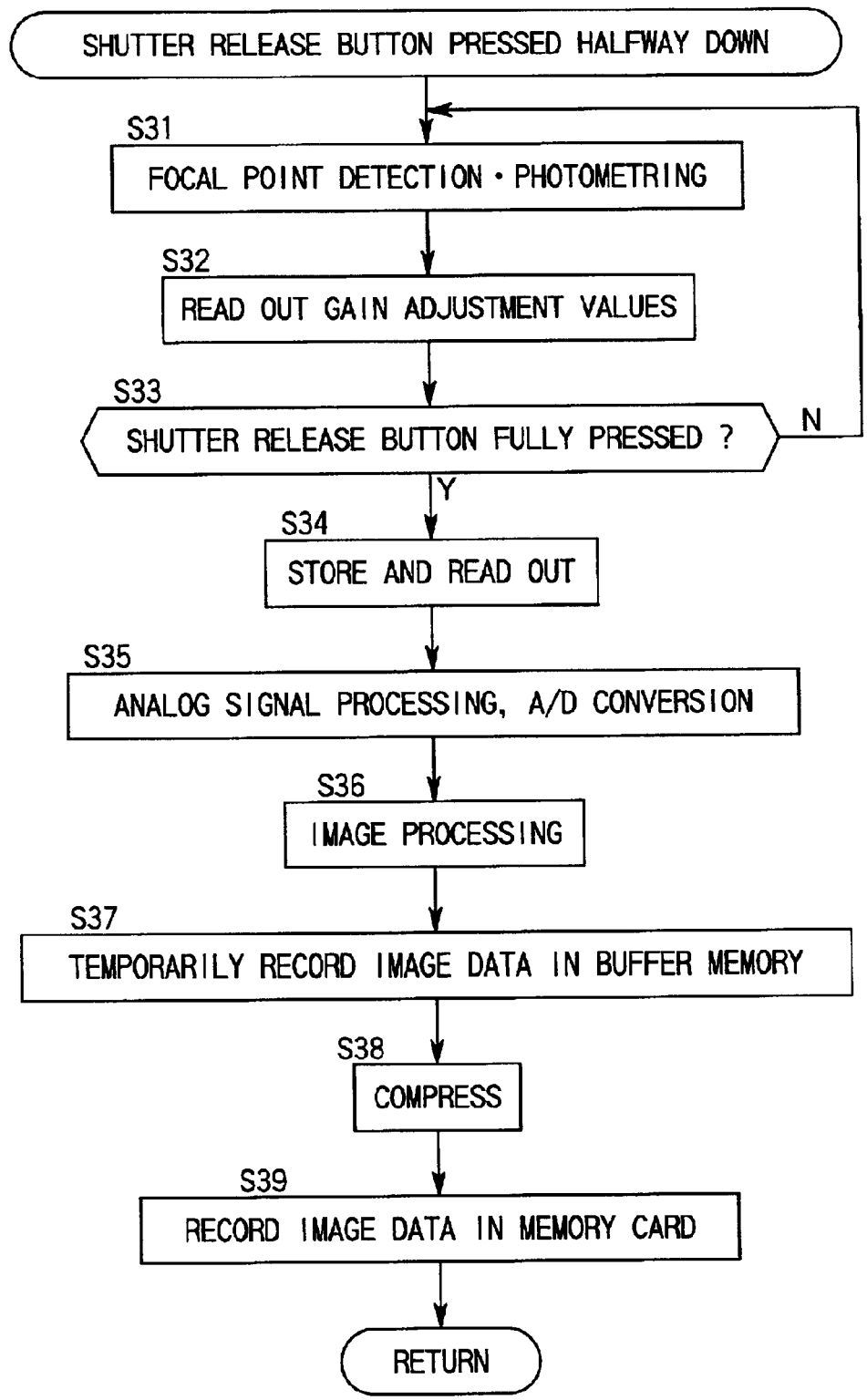
FIG. 11 is a flowchart of the program that is activated through the halfway press switch.

The operation of the digital still camera structured as described above is now explained. FIG. 11 is a flowchart of a program activated through the halfway press switch. When the halfway press switch 22 is operated, a focal point detection operation at the photographic zoom lens 90 and a photometering operation to detect the brightness of the subject are performed in step S31. When the focal adjustment state is detected by the focal point detection device 36, the lens drive device 37 drives the taking lens 91 to the focus position based upon the detected focal adjustment state. The brightness level of the subject is detected by the CPU 35C by using the data output by the image-capturing device for scene analysis 86. When the CPU 35C outputs data indicating the detected brightness to the CPU 21, the CPU 21 calculates an exposure value based upon the brightness data and the aperture value of the zoom lens 90 provided by the lens information input unit 38.

In step S32, the white balance adjustment R gain and B gain values stored in the register at the CPU 21 are read out as explained earlier. If it is decided in step S33 that the full press switch 23 has been operated, the quick return mirror swings upward to start the photographing sequence. In step S34, the individual pixels at the CCD 26 store a charge related to light received, and when the storage is completed, the stored charges at all the pixels are sequentially read out. In step S35, image data that have been read out undergo processing at the analog signal processing circuit 27, are converted to digital image data at the A/D conversion circuit 28 and then are input to the image processing circuit 29. Then, the operation proceeds to step S36, in which the image processing circuit 29 performs the white balance adjustment explained above, gamma gradation control, JPEG formatting processing and the like. When the image processing is completed, the operation proceeds to step S37 in which the image data having undergone the image processing are temporarily stored in the buffer memory 30. In step S38, the image data are read from the buffer memory 30 and data compression is performed at the JPEG compression circuit 33. In step S39, the compressed image data are stored in the memory card 34 before ending the processing.

While the explanation above is given on the assumption that photographing is performed under natural light, it becomes necessary to adjust the white balance adjustment gains if, for instance, photographing is to be performed under fluorescent light. Generally speaking, the color temperatures of RGB data obtained through a photographing operation performed under fluorescent light are higher than those obtained through a photographing operation performed under natural light. Such a difference in the color temperature can be compensated for by correcting the R gain and B gain values in FIG. 7 by a specific quantity. Thus, two look-up tables storing R gain and B gain values are prepared, one for photographing under natural light and the other for photographing under fluorescent light, so that values can be read out by switching look-up tables in correspondence to the photographing light used in the current photographing operation.

The features of this embodiment are summarized below.

(1) In the first scene analysis in steps S12 through S15, the photographic field is divided into sixteen middle-sized areas, the averages of the data in R, G and B colors are calculated for each divided area and the RGB data are converted to TC-Duv coordinate data to detect achromatic color data. As a result, since it is highly likely that a plurality of colors belonging to the subject are present within a given middle-size area block, an advantage is achieved in that achromatic color detection is facilitated by averaging the RGB color data within each block. In addition, while the arithmetic operation that must be performed when converting the RGB data to TC-Duv coordinate data is bound to be lengthy if the photographic field is divided into a large number of areas, the work load on the CPU can be reduced by dividing the photographic field into only sixteen areas, thereby achieving an advantage of reduced processing time.

(2) Since the average value of the color temperatures of achromatic color data detected in the first scene analysis is calculated and the white balance adjustment R gain and B gain are ascertained in correspondence to the average value of the color temperatures thus calculated, consistent white balance adjustment is achieved for the entire image plane, thereby making it possible to reproduce the subject color.

(3) In the second scene analysis in steps S19 through S23, the photographic field is divided into forty small areas, the averages of data in the individual colors, i.e., R, G and B, are calculated in each divided area and then the data are converted to R/G-B/G coordinate data to detect skin color data. In addition, group decision-making processing is performed on detected skin color data so that the detected skin color data are ultimately judged to be true skin color data only if at least a specific number of sets of data among the sets of data surrounding the detected skin color data also indicate skin color. As a result, since the subject in a given small area block is likely to indicate a single color, an advantage is achieved in that detection of a specific color present in each block is facilitated. It is to be noted that the group decision-making processing may be omitted.

(4) The average value of the color temperatures of the data judged to indicate skin color data in the second scene analysis is calculated and the white balance adjustment R gain and B gain are determined in correspondence to the color temperature average value thus calculated. Consequently, optimal white balance adjustment for the skin-colored portion in the photographic field is achieved. For instance, even when photographing a person against a green background, the skin color of the person can be reproduced regardless of the color of the background.

(5) Since the image-capturing device for scene analysis 86 is provided inside the finder device 80, it is possible to obtain scene analysis data through image-capturing performed by the image-capturing device for scene analysis 86, determine the white balance adjustment gains and store them within the CPU 21 before the mirror 71 becomes raised through an operation of the full press switch 23. This eliminates the necessity for ascertaining the white balance adjustment gains during the photographing sequence started in step S34 by operating the full press switch 23, thereby achieving a reduction in the length of time required for the photographing processing compared to a case in which scene analysis data are obtained through image-capturing during the photographing sequence.

(6) Since the image-capturing device for scene analysis 86 is utilized for both the image-capturing operation to obtain scene analysis data and the subject brightness detection, advantages are achieved in that the mounting space can be reduced and in that production costs are reduced compared to an electronic camera that does not employ a dual function image-capturing device.

While the photographic field is divided into sixteen middle-sized areas in the first scene analysis and the photographic field is divided into forty small areas in the second scene analysis in the explanation given above, it may be divided into a number of areas other than sixteen or forty for either scene analysis. In addition, while the explanation is given above on an example in which the photographic field is divided into equal rectangular portions, it does not have to be divided into equal portions or rectangular areas. Furthermore, while the entire area over which light is received at the image-capturing device for scene analysis 86 is divided, only a specific partial area may be used instead.

In the explanation above, sixteen sets of RGB data corresponding to the sixteen areas resulting from the division achieved in the first scene analysis are converted to TC-Duv coordinate data, and forty sets of RGB data corresponding to the forty areas resulting from the division achieved in the second scene analysis are converted to R/G-B/G coordinate data. If the photographic field is not divided into sixteen areas and forty areas, the data corresponding to the smaller is number of divided areas should be converted to TC-Duv coordinate data and the data corresponding to the larger number of divided areas should be converted to R/G-B/G coordinate data. Alternatively, the coordinate system into which conversion is to be achieved may be selected in correspondence to specific photographing purposes, regardless of the number of divided areas. For instance, when photographing a multicolored subject, as in landscape photographing, the TC-Duv coordinate system may be selected to achieve consistent white balance adjustment for all the colors, whereas by selecting the R/G-B/G coordinate system when photographing a person as in portrait photographing, optimal white balance adjustment can be achieved for a specific color such as skin color.

While the white balance adjustment gains are ascertained by detecting skin color in the second scene analysis in the explanation given above, green color or an achromatic color, for instance, may be detected instead of skin color. In addition, the color to be detected may be switched in correspondence to the photographing mode setting so that skin color is detected when photographing a person and green is detected when a landscape is photographed. For instance, by detecting green when the photographing mode is set to a distant-view photographing mode and detecting skin color when it is set to a portrait photographing mode, optimal white balance adjustment is achieved for the individual detected colors. Furthermore, a plurality of colors such as skin color and green may be detected to determine white balance adjustment gains by using the color indicated by the largest number of sets of data having undergone group decision-making processing.

While the second scene analysis is performed if no achromatic color is detected in the first scene analysis, either the first scene analysis or the second scene analysis may be performed selectively to determine the white balance adjustment gains based upon the color temperature obtained through the selected scene analysis. Alternatively, both scene analyses may be implemented, and the white balance adjustment gains may be ascertained by averaging the two color temperatures obtained through the two scene analyses.

While the explanation is given above on an example in which the present invention is adopted in a single lens reflex digital still camera, the present invention may be adopted in digital cameras other than single lens reflex digital still cameras. In such a case, the subject image is formed separately at the image-capturing device for photographing and the image-capturing device for scene analysis by using a beam splitter, a half-mirror or the like. In addition, while the image-capturing device for photographing and the image-capturing device for scene analysis are provided independent of each other in the explanation given above, the image-capturing device for photographing may also function as an image-capturing device for scene analysis. In that case, while the power remains ON, the subject image captured by the image-capturing device for photographing is displayed repeatedly as a through image at a display such as a liquid crystal monitor regardless of whether the shutter release button has been operated or not, and the white balance adjustment gains are determined using the data obtained through image-capturing performed by the image-capturing device for photographing. Furthermore, white balance adjustment is performed on subject image data that are obtained through image-capturing when a shutter release operation is performed by using the white balance adjustment gains.

Moreover, while the TC-Duv coordinate system and the R/G-B/G coordinate system are used as color-related coordinate systems in the explanation above, a coordinate system using color difference signals R-Y and B-Y may be used, instead.

Second Embodiment

Figure 12:
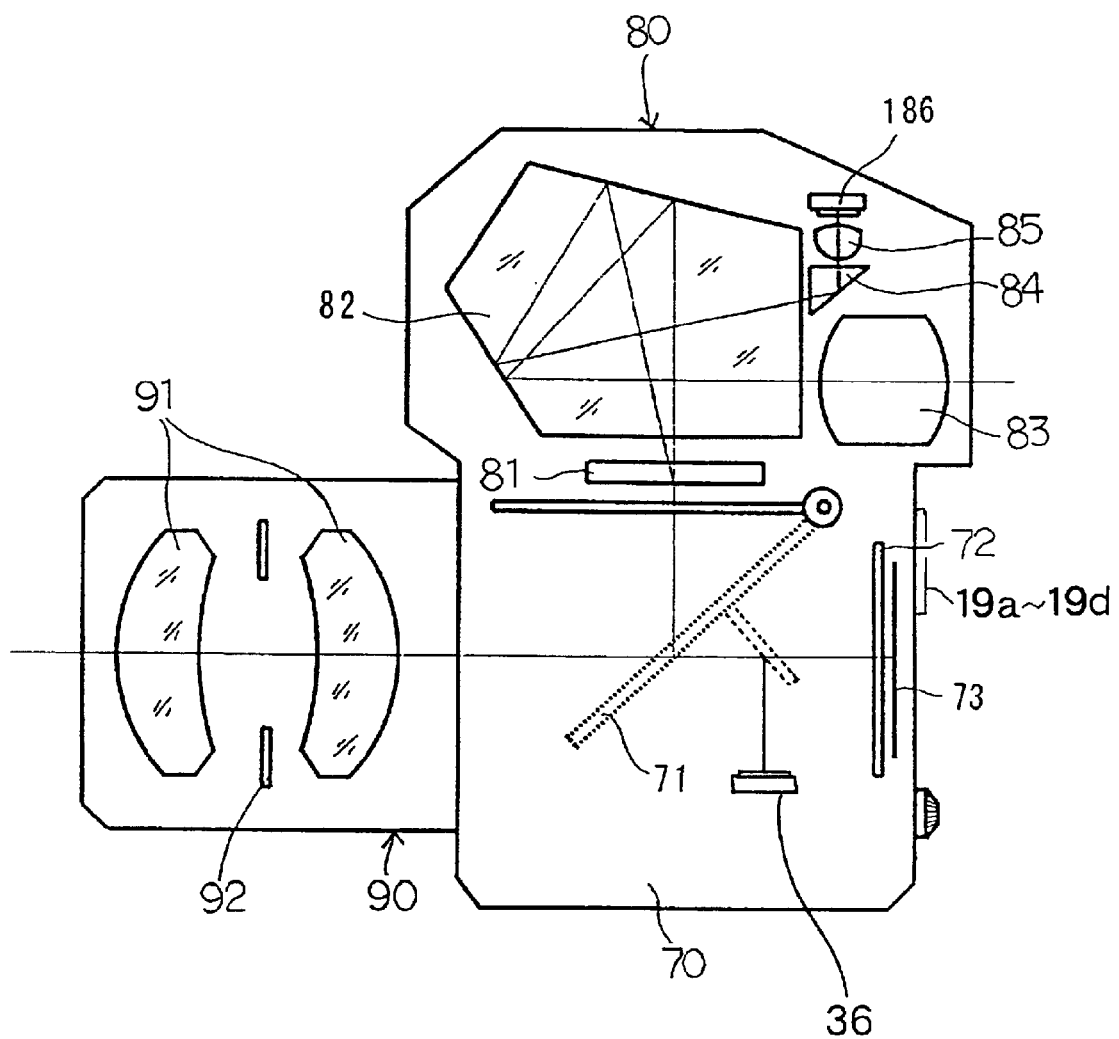
FIG. 12 illustrates the structure adopted in a second embodiment of a single lens reflex digital still camera.

FIG. 12 shows the overall structure of the electronic camera in the second embodiment. The same reference numbers are assigned to components similar to those in FIG. 1 and the explanation will mainly focus on the differences. Reference number 186 indicates a color sensor which is provided at a position conjugate with the position of an image-capturing device 73 relative to a taking lens 91. The color sensor 186 is an image-capturing device similar to the image-capturing device for scene analysis 86 in the first embodiment, and subject light that forms an image at the finder mat 81 further travels through the pentaprism 82, the prism 84 and the image-forming lens 85 to enter the color sensor 186 and form an image of the subject image.

Figure 13:
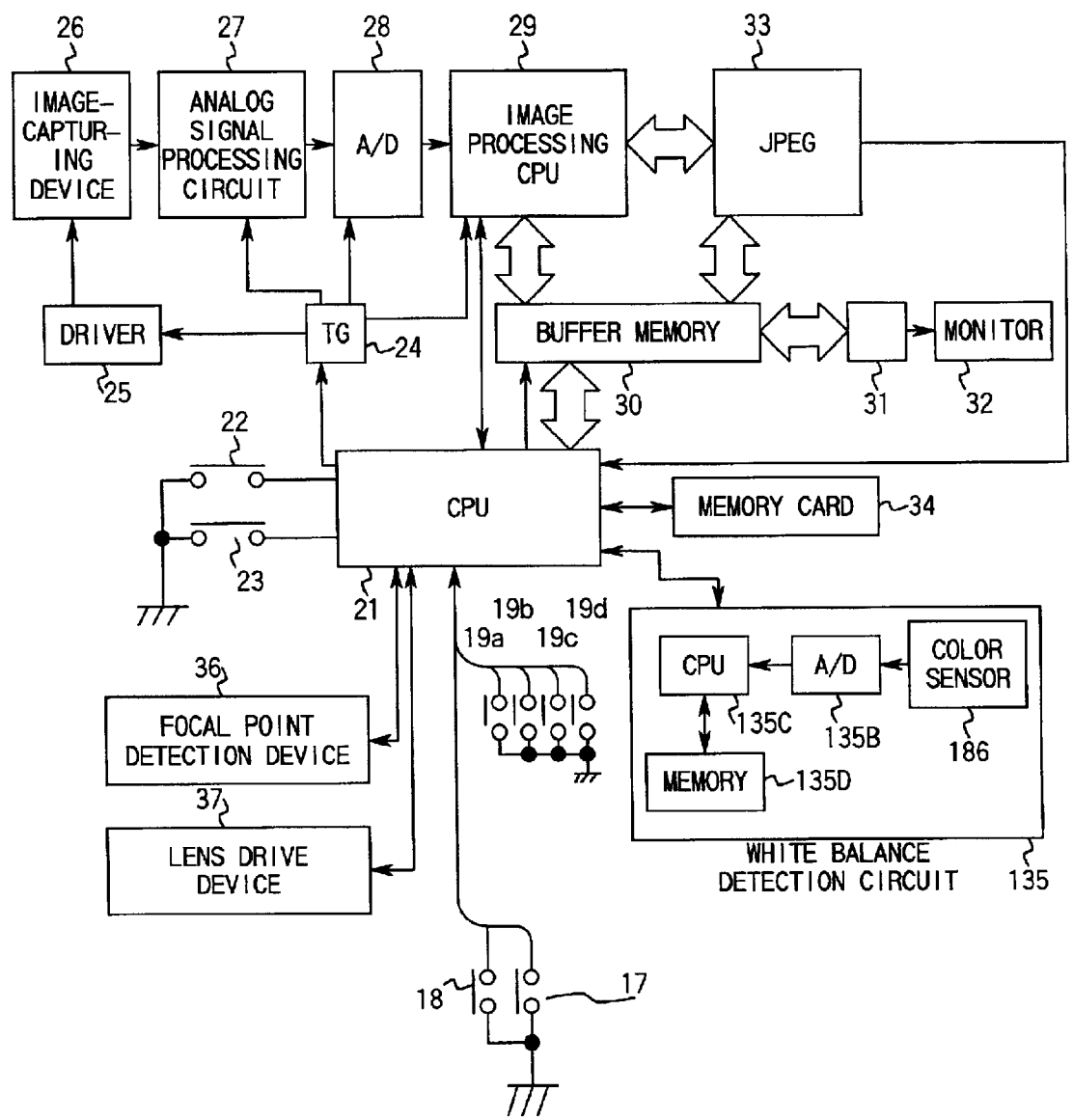
FIG. 13 is a block diagram illustrating the signal processing system in the single lens reflex digital still camera in the second embodiment.

FIG. 13 is a block diagram showing the circuits employed in the second embodiment of the digital camera according to the present invention. The same reference numbers are assigned to components similar to those in the circuit diagram of the first embodiment in FIG. 2 and the explanation will mainly focus on the differences. Input signals from an AE lock switch 17 to be detailed later, which holds the photometering results, an AF lock switch 18 to be detailed later which holds the focal point detection results and area selection switches 19a through 19d which select a focal point detection-area and a photometering area are input to the CPU 21. The focal point detection device 36 has a plurality of focal point detection areas and detects the focal adjustment state in one selected focal point detection area. A white balance detection circuit 135 is connected to the CPU 21.

White Balance Detection

The white balance detection processing performed by the white balance detection circuit 135 in FIG. 13 is now explained in detail. The white balance detection circuit 135 includes the color sensor 186 mentioned above, an A/D conversion circuit 135B that converts an analog signal output by the color sensor 186 to a digital signal, a CPU 135C that generates white balance adjustments gains based upon the digitized signal and a memory 135D in which the referencing look-up table is recorded. The CPU 135C determines white balance adjustment gains by detecting the white balance in the digital data obtained through image-capturing performed by the color sensor 186. In this embodiment, the CPU 135C detects skin color based upon color information in the digital data and determines white balance adjustment gains i.e., the R gain and the B gain for white balance adjustment, in conformance with the detected skin color. It is to be noted that in this specification, a gain adjustment performed to adjust skin color to become a more natural skin color is also referred to as white balance adjustment.

Figure 14:
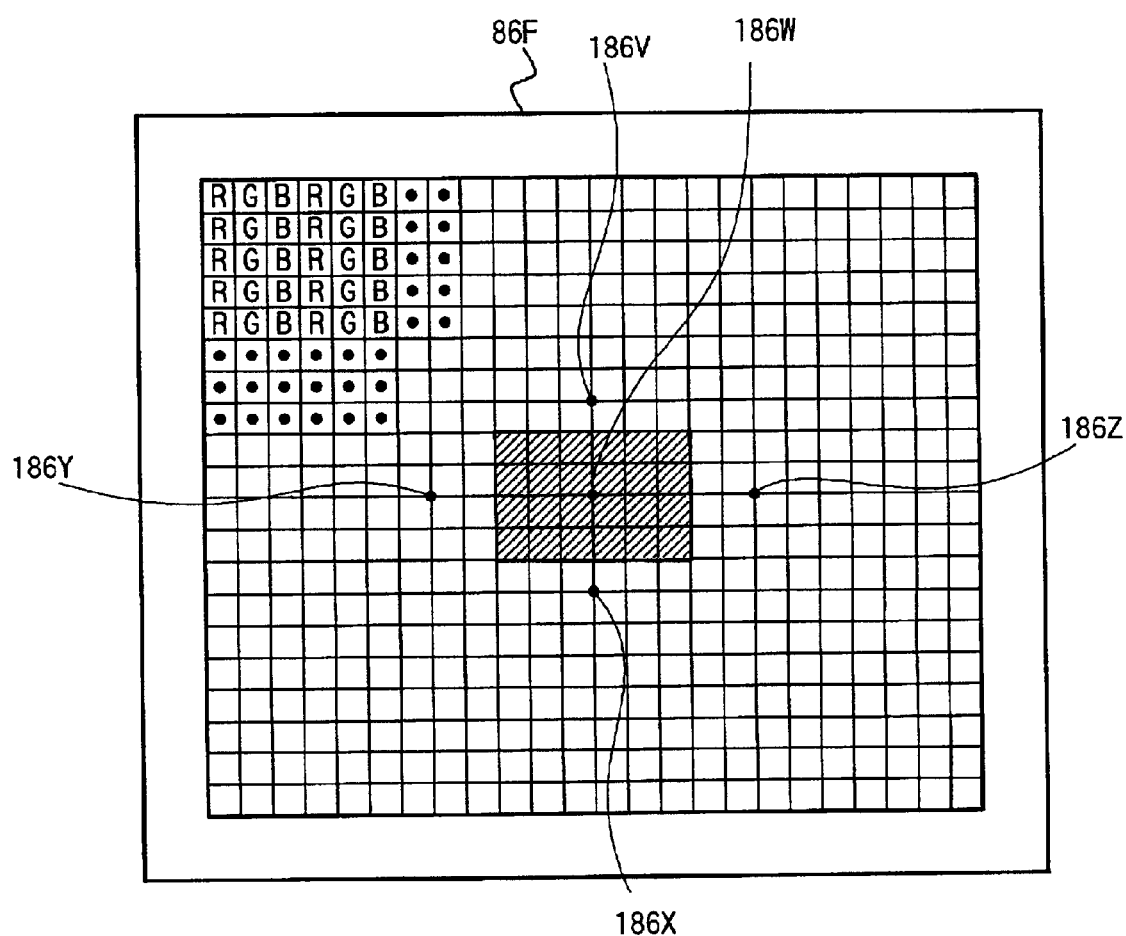
FIG. 14 illustrates the arrangement of filters at the color sensor.

The color sensor 186 is a single two-dimensional image-capturing element provided with 480 pixels arrayed over 24 columns (across)×20 rows (down), for instance, as shown in FIG. 14. At the surface of the color sensor 186, an RGB color filter 86F that is divided into 480 blocks over 24 columns (across)×20 rows (down) in correspondence to the 480 pixels is provided. An image of subject light passing through the color filter is captured with the subject light separated into R color signals, G color signals and B color signals. When the CPU 135C detects color information, subject light color data which correspond to the focal point detection area selected by the focal point detection device 36, to be detailed later, are read out from the color sensor 186.

Points 186V through 186Z in FIG. 14 indicate the positions on the color sensor 186 that correspond to the focal point detection areas. For instance, if the center of the photographic field is set for the focal point detection area through the focal point area setting which is to be detailed later, the R. G and B color data present within the rectangular area (indicated as the shaded area in FIG. 14) over 6 pixels (across)×4 pixels (down) centered around the central point 186W of the color sensor 186 are read out.

In the color data thus read out, one set of color data corresponding to R, G and B colors adjacent to each other along the lateral direction are referred to as a target pixel i, and for each target pixel i read out from the rectangular area, the ratio R/G of the R color data and the G color data and the ratio B/G of the B color data and the G color data are calculated. In the rectangular area ranging over 6 pixels (across)×4 pixels (down), 8 target pixels are present. Data that are likely to indicate skin color are detected by applying the following relationships (7) and (8) to the calculated R/G and B/G.

$$SRGLOWER < Fi(R/G) < SRGUPPER \quad (7)$$

$$SBGLOWER < Fi(B/G) < SBGUPPER \quad (8)$$

In the above relational expressions, SRGLOWER and SRGUPPER represent the lower threshold value and the upper threshold value of the R color ratio in skin color decision-making, and SBGLOWER and SBGUPPER represent the lower threshold value and the upper threshold value of the B color ratio in the skin color decision-making. In addition, Fi(R/G) and Fi(B/G) represent the ratio of the R signal and the G signal and the ratio of the B signal and the G signal in a given target pixel i. These threshold values are stored in advance at the memory 135D, and are set so that 0.9<Fi(R/G)<1.1 and 0.7<Fi(B/G)<0.9, for instance.

Data that are likely to indicate skin color that satisfy the relational expressions (7) and (8) above are now referred to as a target pixel j, and the average value of the ratios R/G corresponding to all the target pixels j and the average value of the ratios B/G corresponding to all the target pixels j are calculated through the following formulae (9) and (10).

$$\frac{1}{m}\sum_{j=1}^{m} Fj(R/G) \quad (9)$$

$$\frac{1}{m}\sum_{j=1}^{m} Fj(B/G) \quad (10)$$

with, Fj(R/G) representing the ratio of the R signal and the G signal in a target pixel j, Fj(B/G) representing the ratio of the B signal and the G signal in the target pixel j, and m representing the number of target pixels j that satisfy the relational expressions (7) and (8).

Figure 15:
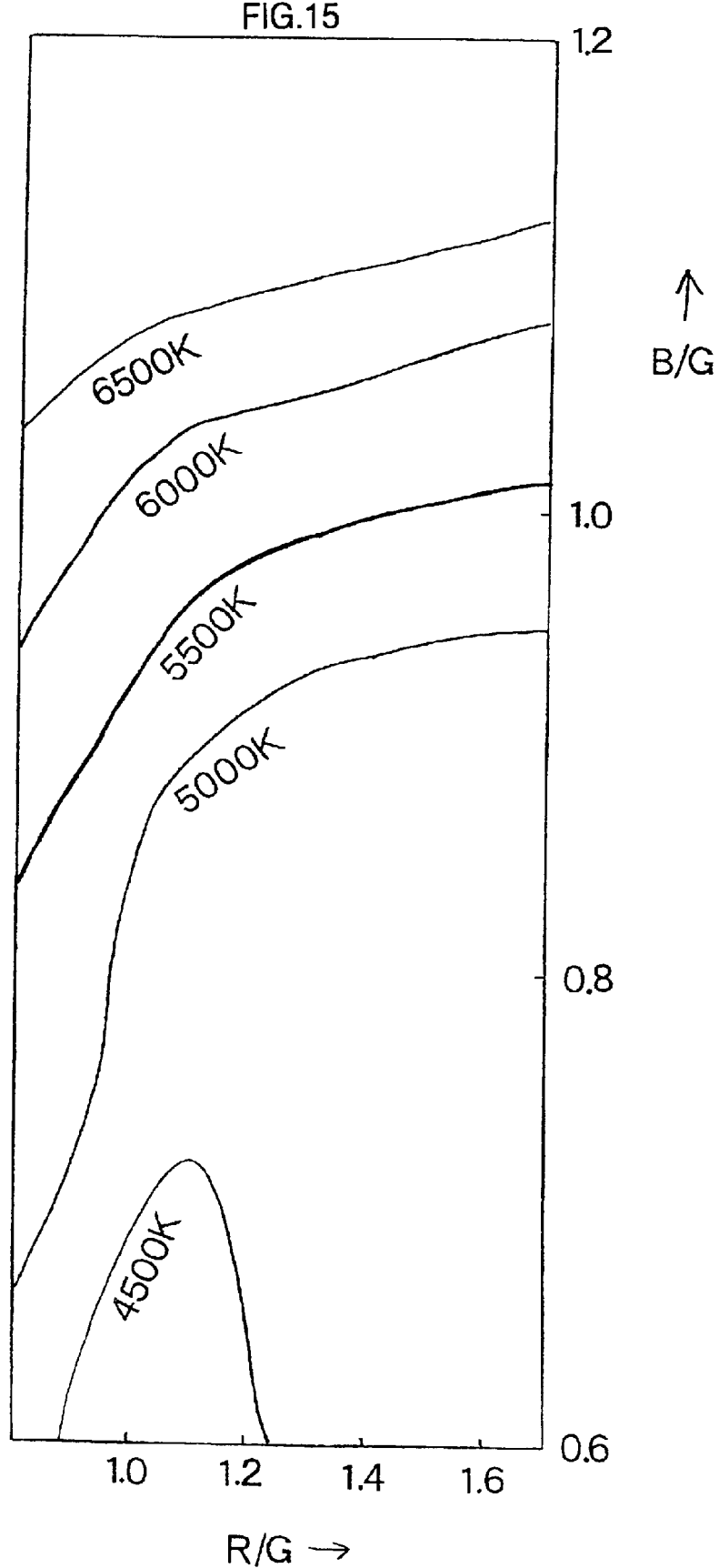
FIG. 15 presents color temperature curves on the R/G-B/G coordinates.

A correlated color temperature is determined based upon the average values of the ratios R/G and the ratios B/G thus calculated. FIG. 15 presents correlated color temperature curves, with the horizontal axis representing R/G and the vertical axis representing B/G. By dividing the R signal and the B signal with the G signal, the red color component and the blue color component in the color of the subject can be expressed, free of any influence of the subject brightness difference. As the color temperature rises, the blue color component becomes more intense, whereas as it decreases, the red color component becomes more intense. Since the correlated color temperature curves in FIG. 15 are stored in advance at the memory 135D as a look-up table, the correlated color temperature is read out from the memory 135D in correspondence to the results obtained through the calculation performed by using formulae (9) and (10) above. In conformance with the correlated color temperature thus read out, the white balance adjustment R gain for the R data and the white balance adjustment B gain for the B data are ascertained using FIG. 7 explained earlier.

As described above, FIG. 7 illustrates the relationships between the correlated color temperature and the R and B gains. The R gain and the B gain values are determined in advance by using data obtained through actual measurement so as to adjust data detected to represent skin color to achieve a more natural skin color and are expressed as functions of the color temperature. These R gain and B gain values are stored in advance at the memory 139 D as a look-up table and are read out from the memory 135 D in correspondence to the ascertained correlated color temperature, as explained above. The R gain and B gain values, thus read out are set as white balance adjustment gains to be used for white balance adjustment. The white balance adjustment gains are stored in the memory 135D and are also Bent to the image processing CPU 29 via the CPU 21.

The white balance adjustment gains determined as described above are used during white balance adjustment that is performed by a gain adjustment circuit 103 on image data subsequently obtained through image-capturing by the CCD 26. The white balance adjustment is achieved by applying the white balance adjustment R gain and B gain respectively to the R signal and the B signal over the entire area obtained through the image-capturing operation performed by the CCD 26, regardless of which area has been used for white balance detection.

Focal Point Detection

Figure 16:
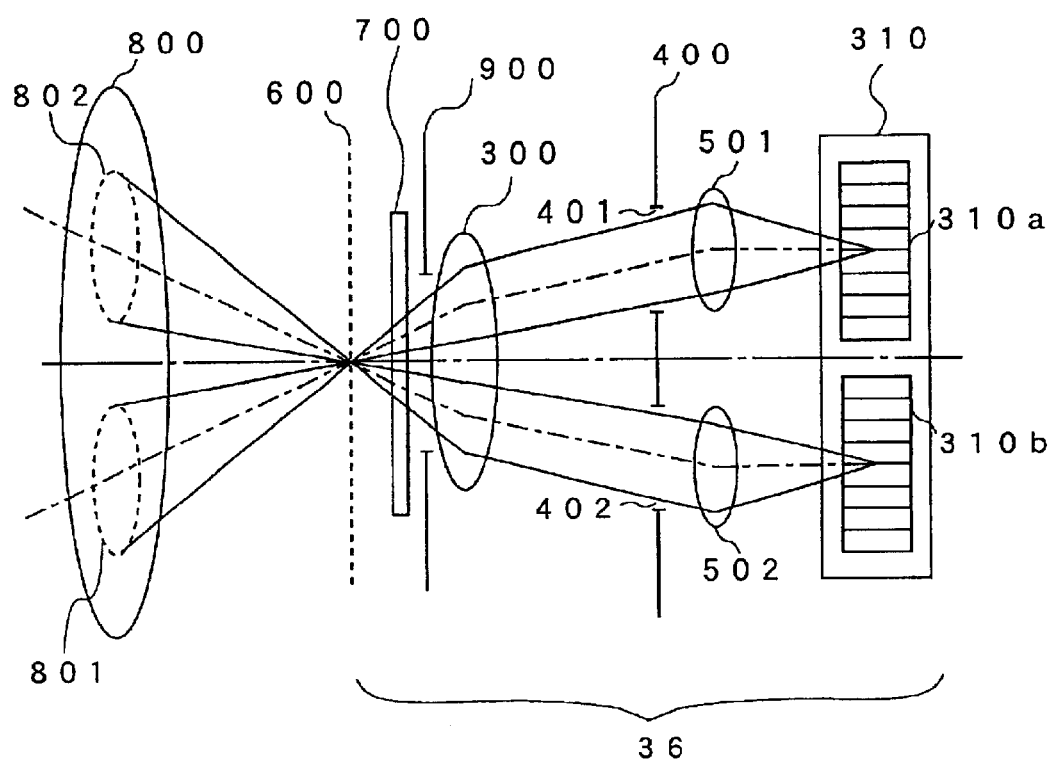
FIG. 16 illustrates the focal point detection device.

In reference to FIG. 16, the structure of the focal point detection device 36 and the principle of the focal point detection operation performed by the focal point detection device 36 are explained. The focal point detection device 36, which is controlled by the CPU 21, is constituted of an infrared light blocking filter 700, a visual field mask 900, a field lens 300, an aperture mask 400, image re-forming lenses 501 and 502, an image sensor 310 and the like. An area 800 represents the exit pupil of the taking lens 91 (see FIG. 12). In addition, areas 801 and 802 are areas where images obtained by reverse projecting opening portions 401 and 402 formed at the aperture mask 400 onto the area 800 by using the field lens 300 are present. It is to be noted that the infrared light blocking filter 700 may be positioned either to the right or to the left of the visual field mask 900. A light flux that has entered via the areas 801 and 802 becomes focused on a plane 600 which is equivalent to the surface of the CCD 26, and then travels through the infrared light blocking filter 700, the visual field mask 900, the field lens 300, the opening portions 401 and 402 and the image re-forming lenses 501 and 502 to form an image on image sensor arrays 310a and 310b.

The pair of subject images formed on the image sensor arrays 310a and 310b are positioned close to each other in a so-called front focus state in which the taking lens 91 forms a clearly defined image of the subject at a position preceding (toward the subject) at a CCD 26-equivalent plane 600, whereas they are positioned further away from each other in a so-called rear focus state in which a clearly defined image of the subject is formed at the position rearward relative to CCD 26-equivalent plane 600. When the subject images formed on the image sensor arrays 310a and 310b achieve a specific distance from each other, the clearly defined image of the subject is set on the CCD 26-equivalent plane 600. Thus, by converting this pair of subject images through electrical signals to photoelectric conversion performed at the image sensor arrays 310a and 310b and ascertaining the relative distance between the pair of subject images through arithmetic processing performed on the signals, the focal adjustment state of the taking lens 91, i.e., the distance over which and the direction in which the position at which the clearly defined image formed by the interchangeable lens 90 is offset from the CCD 26-equivalent plane 600 that are indicated as an offset quantity are determined. In FIG. 16, the focal point detection area is equivalent to the area over which the image sensor arrays 310a and 310b, which are reverse projected by the image re-forming lenses 501 and 502 overlap each other in the vicinity of the CCD 26-equivalent plane 600.

Figure 17:
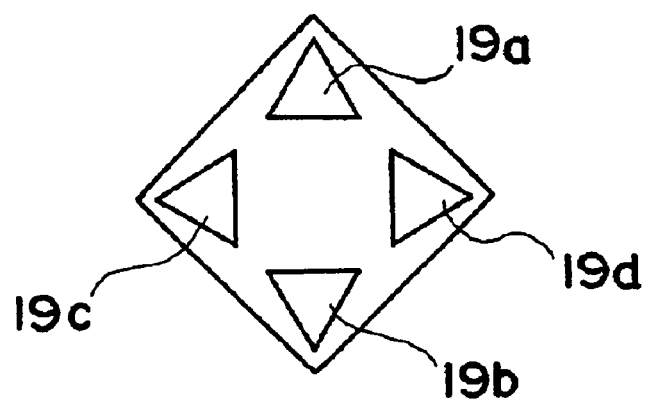
FIG. 17 illustrates the area selection switch.
Figure 18:
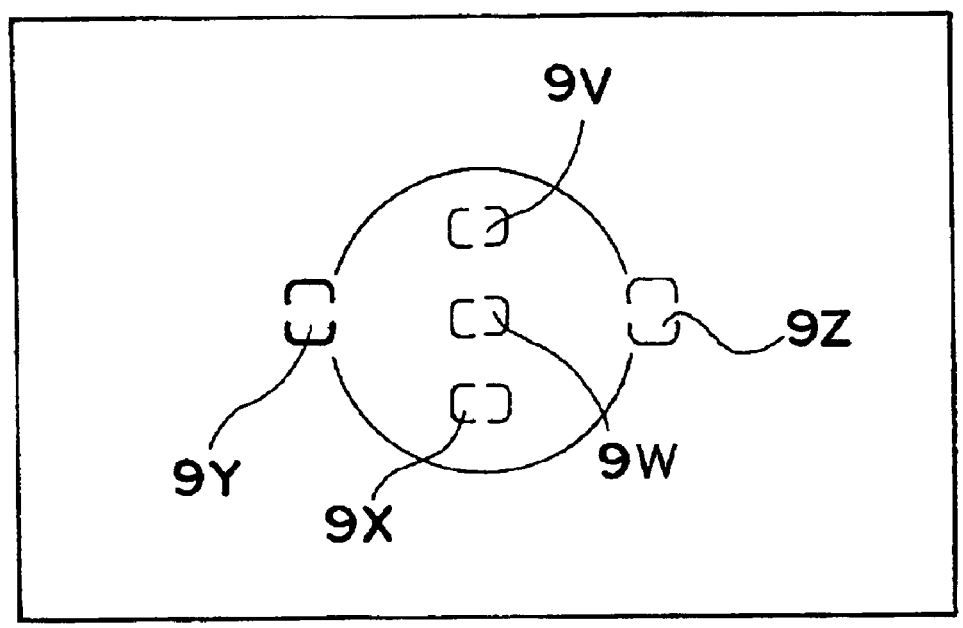
FIG. 18 shows the screen observed through the eyepiece lens.

The focal point detection area is set within the photographic image plane in the following manner. FIG. 17 illustrates the area selection switches 19a through 19d provided at the rear of the digital still camera. FIG. 18 shows a screen observed through the eyepiece lens 83. The 5 marks 9V through 9Z in FIG. 18 indicate focal point detection areas. A new focal point detection area is selected by operating one of the area selection switches 19a through 19d before a specific length of time elapses after an operation of the halfway press switch 22.

When the halfway press switch 22 is operated, the area selection switches 19a through 19d become effective over a specific length of time. If the switch 19a is operated during this period of time, the focal point detection area setting is changed to the focal point detection area 9V positioned above the currently selected focal point detection area 9W in FIG. 18. If the area selection switch 19b is operated, the focal point detection area setting is changed to the focal point detection area 9W again. If the area selection switch 19c is operated, the focal point detection area setting is changed to the focal point detection area 9Y to the left of the focal point detection area 9W. Likewise, by operating the area selection switch 19d, the focal point detection area setting is changed to the focal point detection area 9Z positioned to the. right of the currently selected focal point detection area 9W. The selected focal point detection area is highlighted compared to the markers of the other areas, as is the area 9Y in FIG. 18, for instance. When the photographer selects one of the marks 9V through 9Z located on the main subject, the focal adjustment state in the focal point detection area within the photographic image plane corresponding to the selected mark is detected as described earlier.

It is to be noted that FIG. 16 shows only one focal point detection area to facilitate explanation of the principle of the focal point detection. When there are a plurality of focal point detection areas within the photographic field as shown in FIG. 18, a plurality of openings, the number of which corresponds to the number of focal point detection areas, are formed at the visual field mask 900. In addition, an optical system is provided so that a light flux having passed through the plurality of openings at the visual field mask 900 form a pair of subject images per opening.

During the focal point detection operation performed by the focal point detection device 36, when the AF lock switch 18 is turned ON, the taking lens 91 is moved to the focus position by the lens drive circuit 37 in conformance to the currently detected focal adjustment state, and the subsequent focal point detection operation is suspended until the photographing processing is completed. The information with regard to the focal point detection area used in the focal point detection operation is also used to determine the area to undergo white balance detection as explained earlier. Namely, points 186V through 186Z on the color sensor 186 respectively correspond to the focal point detection areas 9V through 9Z. For instance, if the area 9Y in FIG. 18 is selected as the focal point detection area, the G, B and R color data present within the rectangular area ranging over 6 pixels (across)×4 pixels (down) centered on the point 186Y in FIG. 14 are read out from the color sensor 186 during the white balance detection explained earlier. The focal point detection area information and the operating state of the AF lock switch 18 are also sent to the white balance detection circuit 135 from the CPU 21.

Figure 19:
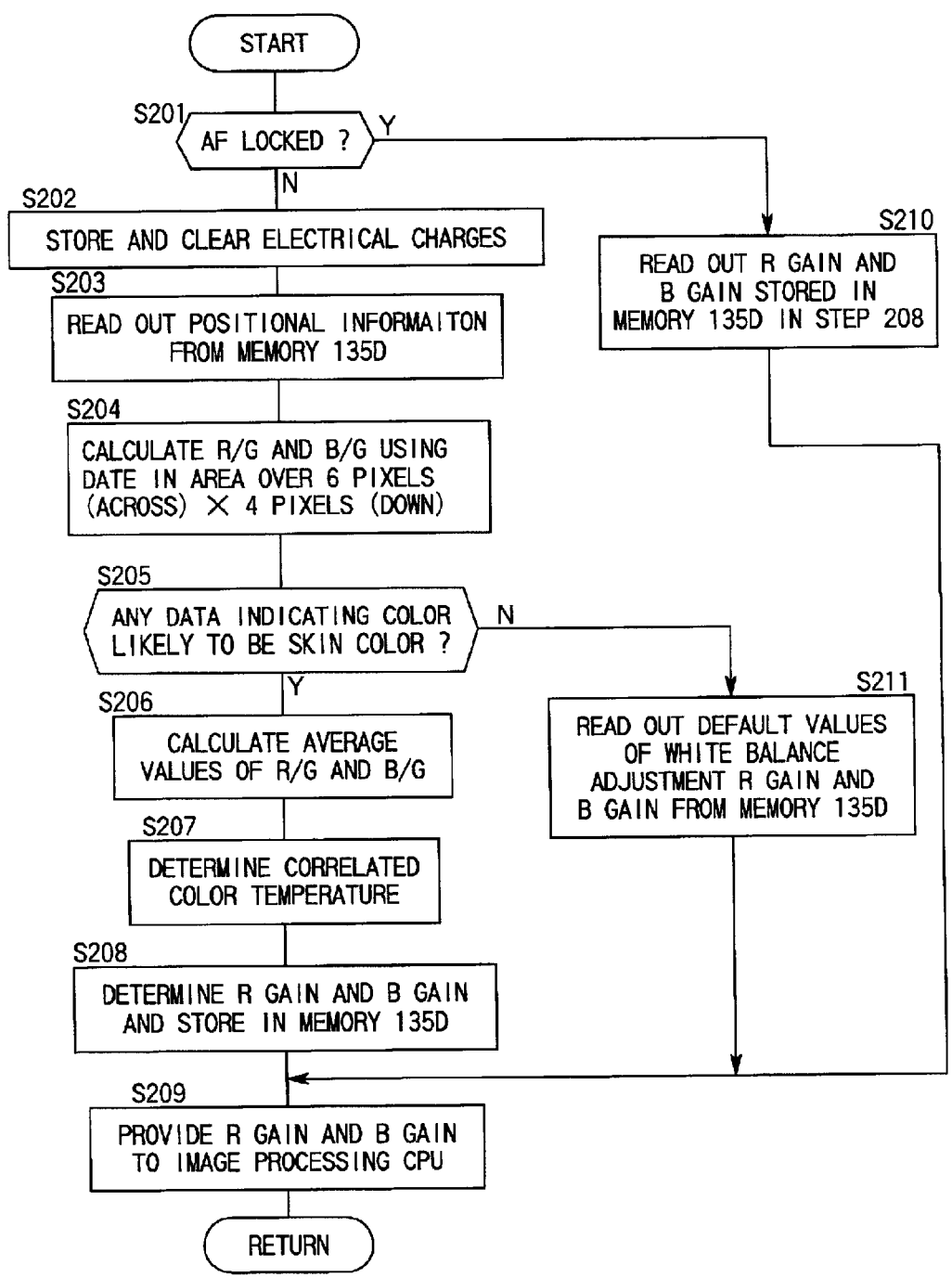
FIG. 19 is a flowchart of the white balance detection processing.

FIG. 19 is a flowchart of the white balance detection processing achieved in the embodiment. In step S201, a decision is made as to whether or not the AF lock switch 18 has been turned ON. If a negative position is made (step S201; N), the operation proceeds to step S202, whereas if an affirmative decision is made (step S201; Y), the operation proceeds to step S210. In step S202, signal charges are stored at the color sensor 186 and signals corresponding to the stored charges are converted to digital data at the A/D conversion circuit 135B. In step S203, positional information indicating the focal point detection area over which a focal point detection operation is to be performed by the focal point detection device 36 is read out from the memory 135D. In step S204, the ratio of the R color data and G color data and the ratio of the B color data and the G color data in the R, G and B color pixel data within the specific area centered on the position corresponding to the focal point detection area on the color sensor 186 are calculated.

In step S205, a decision is made as to whether or not there are any data likely to indicate skin color among the target pixels i by using relational expressions (7) and (8). If at least one target pixel j satisfying both of the relational expressions is detected, an affirmative decision is made (step S205; Y), and in that case the operation proceeds to step S206. In step S206, the average values of m sets each of ratios R/G and B/G detected by using relational expressions (7) and (8) are calculated by using formulae (9) and (10).

In step S207, the correlated color temperature corresponding to the average values of the ratios R/G and B/G thus calculated is read out from the memory 135D. In step S208, the white balance adjustment R gain for the R data and the white balance adjustment B gain for the B data are ascertained based upon the relationships between the correlated color temperature and the white balance adjustment gains shown in FIG. 7. The R gain and the B gain thus determined are stored in the memory 135D. In step S209, the white balance adjustment R gain and B gain are provided to the image processing CPU 29, and thus, the processing in FIG. 19 ends.

If a negative decision is made (step S205; N) in step S205, the operation proceeds to step S211, in which specific white balance adjustment R gain and B gain stored in the memory 135D are read out. These R gain and B gain values are stored in advance in the memory 135D as default values.

If an affirmative decision is made in step S201, the operation proceeds to step S210 to read out the R gain and the B gain stored in step S208 during the previous operation from the memory 135D. In other words, if the AF lock switch 18 is in an ON state, another arithmetic operation to ascertain white balance adjustment gains is not performed. When the AF lock switch 18 is turned ON, the white balance adjustment gains are determined based upon data indicating a color likely to be skin color that are detected at that point in time and the subsequent white balance detection operation is suspended until the photographing operation is completed. The operating state of the AF lock switch 18 is also provided to the white balance detection circuit 135 from the CPU 21.

The operation of the digital still camera structured as described above is now explained. FIG. 20 is a flowchart of the photographing processing. In step S301, a decision is made as to whether or not the AF lock switch 18 is set in an ON state. If a negative decision is made (step S301; N), the operation proceeds to step S302, whereas if an affirmative position is made (step S301; Y), the operation proceeds to step S303. In step S302, the focal point detection device 36 detects the focal adjustment state, and based upon the focal adjustment state thus detected, the lens drive device 37 drives the taking lens 91 to the focus position. In step S303, the white balance detection processing explained in reference to FIG. 19 is performed.

In step S304, the individual pixels at the CCD 26 store light-receiving signals, and when the storage is completed, the stored charges in all the pixels are sequentially read out.

The image data thus read out undergo the processing at the analog signal processing circuit 27, are converted to digital image data at the A/D conversion circuit 28 and are data to the image processing CPU 29. The image processing CPU 29 performs specific types of image processing including the white balance adjustment explained earlier, and in step S305, a through image resulting from the image processing is displayed at the monitor 32.

In step S306, a decision is made as to whether or not the halfway press switch 22 has been operated, and if an affirmative decision is made (step S306; Y), the operation proceeds to step S307, whereas if a negative decision is made (step S306; N), the operation returns to step S301. In step S307, a photometering operation to detect the brightness level of the subject is performed. The subject brightness detection is performed by the CPU 135C by using the data output from the color sensor 186. When the CPU 135C outputs the brightness data obtained through the detection to the CPU 21, the CPU 21 performs exposure calculation based upon the brightness data. In step S308, a decision is made as to whether or not the AF lock switch 18 has been turned ON. If a negative decision is made (step S308; N), the operation proceeds to step S309, whereas if an affirmative decision is made (step S308; Y), the operation proceeds to step S310.

In step S309, the focal point detection device 36 detects the focal adjustment state, and based upon the detected focal adjustment state, the lens drive device 37 drives the taking lens 91 to the focus position. If it is decided in step S310 that the full press switch 23 has been operated (step S310; Y), the quick-return mirror swings upward and the photographing sequence starting in step S311 begins. If, on the other hand, a negative decision is made (step S310; N), the operation proceeds to step S317 to perform timeout decision-making. If it is decided in step S317 that there is no timeout (step S317; N), the operation returns to step S310, whereas if it is decided in step S317 that time is up (step S317; Y), the processing in FIG. 20 ends without performing a photographing sequence.

In step S311, the individual pixels at the CCD 26 store light-receiving signals and when the storage is completed, the stored charges in all pixels are sequentially read out. In step S312, the image data that have been read out undergo the processing at the analog signal processing circuit 27, are converted to digital image data at the A/D conversion circuit 28 and are input to the image processing CPU 29. Then, the operation proceeds to step S313, in which the white balance adjustment explained earlier, the gamma gradation control, JPEG formatting processing and the like are performed at the image processing CPU 29. When the image processing is completed, the operation proceeds to step S314 to temporarily store the image data resulting from the image processing in the buffer memory 30 and also to display a freeze frame image at the monitor 32. In step S315, the image data read from the buffer memory 30 are compressed at the JPEG compression circuit 33. In step S316, the compressed image data are stored in the memory card 34 before ending the processing in FIG. 20.

While the explanation is given above on the assumption that photographing is performed under natural light, it is necessary to adjust the white balance adjustment gains if a photographing operation is performed under fluorescent light. Generally speaking, in the color temperatures of the RGB data obtained through a photographing operation performed under fluorescent light are higher than color temperatures resulting from a photographing operation performed under natural light. This difference in the color temperatures can be compensated for by correcting the R gain and the B gain values in FIG. 7 by specific quantities. Thus, two look-up tables storing R gain and B gain values should be provided, one for photographing under natural light and the other for photographing under fluorescent light so that values can be read out from the look-up table corresponding to the photographing light set by the photographer in advance.

The following advantages are achieved in the digital camera in the second embodiment.

(1) Target pixels j, with data indicating a color likely to be skin color are detected in the output from the color sensor 186, the averages of the ratios R/G and B/G in the target pixels j thus detected are ascertained and the average values are converted to data in the R/G-B/G coordinate system to obtain the corresponding correlated color temperature. In addition, the white balance adjustment R gain and B gain are determined in correspondence to the correlated color temperature thus ascertained so that optimal white balance adjustment is performed on skin color data. Consequently, when performing a portrait photographing operation, a white balance adjustment that is optimal for the skin color of the person is achieved regardless of the color of the background.

(2) The detection of target pixels j with data indicating a color likely to be skin color in (1) above is performed by using color data read out from the color sensor 186 in correspondence to the focal point detection area selected by the focal point detection device 36. In other words, if the focal point detection area 9Y in FIG. 18 is selected, target pixels j are detected by using the R, G and B color data present within the rectangular area ranging over 6 pixels (across)×4 pixels (down) centered on the point 186Y in FIG. 14. Since the focal point detection area is normally set at the position at which the main subject is present, by using the color data from the color sensor 186 corresponding to this area, an advantage is achieved in that the detection of data indicating a color likely to be skin color is facilitated for portrait photographing.

(3) When the AF lock switch 18 is turned ON, the white balance adjustment gains are determined based upon the data indicating a color likely to be skin color that are detected at that point in time, and the subsequent white balance detection operation is suspended until the photographing processing is completed. For instance, by turning ON the AF lock switch 18 with the main subject positioned in the selected focal point detection area and then panning the camera before performing the photographing operation, the optimal white balance adjustment gains and the optimal focus state for the main subject can be sustained even when photographing with the main subject set outside the focal point detection area.

(4) Since the color sensor 186, is provided within the finder device 80, the white balance adjustment gains can be determined and provided to the image processing CPU 29 in advance by receiving data for white balance detection at the color sensor 186 before the mirror 71 is raised through an operation of the full press switch 23. Thus, since the need for determining the white balance adjustment gains during the photographing sequence started in step S311, by the operation of the full press switch 23 is eliminated, the length of time required for the photographing processing is reduced compared to the processing time required for a photographing sequence during which data for white balance detection are received.

(5) Since the color sensor 186 is utilized for both white balance detection and subject brightness detection, the mounting space can be reduced and the production cost can be reduced compared to a camera having separate devices for white balance detection and subject brightness detection.

While the explanation above is given on a single lens reflex digital still camera, the present invention may be adopted in digital cameras other than single lens reflex digital still cameras. In such a case, separate subject images are formed at the CCD 26 and the color sensor 186 by employing a beam splitter, a half mirror or the like.

In addition, while the CCD 26 and the color sensor 186 are provided independently of each other in the explanation given above, the CCD 26 may also function as a color sensor. In such a case, the white balance adjustment gains are determined as described above by using data obtained through image-capturing performed by the CCD 26. Then, white balance adjustment is performed using the white balance adjustment gains on the subject image data obtained through image-capturing performed in response to a shutter release operation.

While the CCD, 26 and the image sensor 310 of the focal point detection device 36 are provided independently of each other in the explanation given above, the functions of the image sensor 310 may be achieved through CCD 26 instead. In addition, while the image sensor 310 and the color sensor 186 are provided independently of each other, the functions of the color sensor 186 may be achieved through the image sensor 310 instead. Furthermore, the CCD 26 may also function as both the image sensor 310 and the color sensor 186.

In the explanation given above, when the CPU 135C detects color information, the color data are read out from the rectangular area of the color sensor 186, ranging over 6 pixels (across)×4 pixels (down) centered on the position corresponding to the focal point detection area, and the ratio of the R color data and the G color data and the ratio of the B color data and the G color data in the R, G and B color data thus read out are calculated. However, R/G and B/G may be calculated by reading out a set of R, G and B data in the vicinity of the position on the color sensor 186 corresponding to the focal point detection area instead of using the color data within the rectangular area described above.

In the explanation above, target pixels j with data in indicating a color likely to be skin color are detected in correspondence to the focal point detection area selected by the focal point detection device 36. However, if the digital camera has a plurality of photometering areas within the photographic field and a spot photometering operation is performed in one of the photometering areas that is selected, target pixels j with data indicating a color likely to be skin color may be detected in correspondence to the selected photometering area instead. In the embodiment, the subject brightness is detected based upon the level of the value of the color data output by the color sensor 186 and the exposure calculation is performed based upon the detected brightness value. Thus, the brightness detection and the white balance detection may both be performed by using the color data read from the color sensor 186 in correspondence to the selected photometering area. Since the spot photometering area is set at the main subject under normal circumstances, an advantage is achieved in that by using the color data read out from the color sensor 186 in correspondence to the selected spot photometering area, the detection of data indicating a color likely to be skin color is facilitated in portrait photographing.

In addition, in step S201 in the flowchart presented in FIG. 19, a decision is made as to whether or not the AF lock switch 18 has been turned ON, and if it is decided that the AF lock switch 18 has been turned ON, the operation proceeds to step S210 to suspend the subsequent white balance detection operation until the photographing processing is completed. Alternatively, a decision may be made in step S201 as to whether or not the AE lock switch 17 instead of the AF lock switch 18 has been turned ON. In this case, when the AE lock switch 17 is turned ON, the white balance adjustment gains are determined based upon the data indicating a color likely to be skin color that are detected at that point in time and the subsequent white balance detection operation is suspended until the photographing processing is completed. For instance, by turning ON the AE lock switch 17 with the main subject positioned at the center of the photographic field and then panning the camera before performing the photographing operation, the optimal white balance adjustment gains and the optimal exposure value that have been calculated for the main subject are maintained even when photographing with the main subject offset from the center of the photographic field. The photometering area information and the operating state of the AE lock switch 17 are also provided to the white balance detection circuit 135 from the CPU 21.

Moreover, step S201 in FIG. 19 may be omitted. In such a case, the white balance detection operation in step S202 and in the subsequent steps is performed, regardless of operating state of the AF lock switch 18. In addition, steps S301 and S308 in the flowchart in FIG. 20 may be omitted. In this case, a focal point detection operation is performed by the focal point detection device 36 in step S302 and step S309.

What is claimed is:

1. An electronic camera comprising:
   an image-capturing device for photographing that captures an image of a subject image passing through a taking lens and outputs image data;
   an image-capturing device for scene analysis that is provided at a position conjugate with said image-capturing device for photographing relative to said taking lens and receives light from the subject image to output scene analysis image data;
   a gain calculation unit that calculates gain by using at least either image data corresponding to a large area of said image-capturing device for scene analysis or image data corresponding to a small area of said image-capturing device for scene analysis; and
   a gain adjustment unit that performs gain adjustment by applying said gain calculated at said gain calculation unit to the image data output by said image-capturing device for photographing.

2. An electronic camera according to claim 1, wherein:
   said large area is constituted of a plurality of first areas obtained by dividing the image-capturing area of said image-capturing device for scene analysis, into a unit area including a first specific number of pixels; and
   said small area is constituted of a plurality of second areas achieved by dividing the image-capturing area of said image-capturing device for scene analysis into a unit area including a second specific number of pixels which is smaller than the first specific number.

3. An electronic camera according to claim 1, wherein:
   said gain calculation unit selects image data of either said large area or said small area in correspondence to the type of subject and calculates gain based on the image data in the selected area.

4. An electronic camera according to claim 2, further comprising:
   a decision-making unit that makes a decision as to whether or not there is an area having image data that are judged to indicate an achromatic color among said plurality of first areas and further makes a decision as to whether or not there is an area having image data judged to indicate skin color among said plurality of second areas if it is decided that there is no area with image data judged to indicate an achromatic color, wherein:

if said decision-making unit decides that there is an area having image data that are judged to indicate an achromatic color, said gain calculation unit calculates gain based upon the image data in said area having the image data judged to indicate an achromatic color; and if said decision-making unit decides that there is an area having image data that are judged to indicate skin color, said gain calculation unit calculates gain based upon the image data in said area having the image data indicating skin color.

5. An electronic camera comprising:

an image-capturing device for photographing that captures an image of a subject image passing through a taking lens and outputs image data;

an image-capturing device for scene analysis that is provided at a position conjugate with said image-capturing device for photographing relative to said taking lens and receives light from the subject image to output scene analysis image data;

a detection unit that detects an area having image data that are judged to indicate a predetermined color in image data corresponding to a predetermined area of said image-capturing device for scene analysis;

a gain calculation unit that calculates gain based upon a color indicated by the image data in said area detected by said detection unit; and a gain adjustment unit that performs gain adjustment by applying said gain calculated by said gain calculation unit to the image data output by said image-capturing device for photographing.

6. An electronic camera according to claim 5, wherein:

said detection unit detects:

(1) presence of an area having image data judged to indicate an achromatic color among a plurality of first areas achieved by dividing an image-capturing area of said image-capturing device for scene analysis into a unit area including a first specific number of pixels; and (2) presence of an area having image data judged to indicate skin color among a plurality of second areas achieved by dividing the image-capturing area of said image-capturing device for scene analysis into a unit area including a second specific number of pixels which is smaller than the first specific number.

7. An electronic camera according to claim 6, wherein:

said detection unit performs detection for an area having image data that are judged to indicate skin color if an area having image data that are judged to indicate an achromatic color cannot be detected.

8. An electronic camera according to claim 5, further comprising:

a selection unit that selects either a first photographing mode suited to white balance adjustment performed by using an achromatic color or a second photographing mode suited to white balance adjustment performed by using skin color, wherein:

a color to be detected by said detection unit is selected in correspondence to a photographing mode selected by said selection unit and gain is calculated by using image data indicating the selected color.

9. An electronic camera according to claim 5, further comprising:

a selection unit that selects, at least, a landscape photographing mode, wherein:

if the landscape photographing mode has been selected by said selection unit, said detection unit detects, at least, an area having image data that are judged to indicate an achromatic color; and said gain calculation unit calculates gain based upon the image data in said area having the image data judged to indicate an achromatic color.

10. An electronic camera according to claim 5, further comprising:

a selection unit that selects, at least, a portrait photographing mode, wherein:

if said portrait photographing mode has been selected by said selection unit, said detection unit detects, at least, an area having image data judged to indicate skin color; and said gain calculation unit calculates gain based upon the image data in said area having the image data judged to indicate skin color.

11. An electronic camera comprising:

an image-capturing device for photographing that captures an image of a subject image passing through a taking lens and outputs image data;

an image-capturing device for scene analysis that is provided at a position conjugate with said image-capturing device for photographing relative to said taking tens and receives light from the subject image to output scene analysis image data;

a conversion unit that converts image data in a predetermined area of said image-capturing device for scene analysis to color data in either a first color-related coordinate system or a second color-related coordinate system;

a gain calculation unit that calculates gain based upon the color data resulting from conversion performed by said conversion unit; and a gain adjustment unit that performs gain adjustment by applying said gain calculated by said gain calculation unit to the image data output by said image-capturing device for photographing.

12. An electronic camera according to claim 11, wherein:

said conversion unit converts:

(1) image data in a plurality of first areas achieved by dividing an image-capturing area of said image-capturing device for scene analysis into a unit area including to a first specific number of pixels, to color data in the first coordinate system; and (2) converts image data in a plurality of second areas achieved by dividing the image-capturing area of said image-capturing device for scene analysis into a unit area including a second specific number of pixels that is smaller than the first specific number, to color data in the second coordinate system.

13. An electronic camera according to claim 11, further comprising:

a selection unit that selects either a first photographing mode suited to white balance adjustment performed by using an achromatic color or a second photographing mode suited to white balance adjustment performed by using skin color, wherein:

said conversion unit converts the image data in the predetermined area of said image-capturing device for scene analysis to color data in the first coordinate system or the second coordinate system in correspondence to the photographing mode selected by said selection unit.

14. An electronic camera according to claim 11, further comprising:
   a selection unit that selects, at least, a landscape photographing mode, wherein:
   if the landscape photographing mode has been selected by said selection unit, said conversion unit converts the image data in the predetermined area of the image-capturing device for scene analysis to color data in the first coordinate system.

15. An electronic camera according to claim 11, further comprising:
   a selection unit that selects, at least, a portrait photographing mode, wherein:
   if said portrait photographing mode has been selected by said selection unit, said conversion unit converts the image data in the predetermined area of said image-capturing device for scene analysis to color data in the second coordinate system.

16. An electronic camera comprising:
   an image-capturing device for photographing that captures an image of a subject image passing through a taking lens and outputs image data;
   an image-capturing device for scene analysis that is provided at a position conjugate with said image-capturing device for photographing relative to said taking lens and receives light from the subject image to output scene analysis image data;
   a conversion unit that converts image data in a plurality of first areas achieved by dividing an image-capturing area of said image-capturing device for scene analysis into a unit area including a first specific number of pixels, to color data in a first color-related coordinate system or converts image data in a plurality of second areas achieved by dividing the image-capturing area of said image-capturing device for scene analysis into a unit area including a second specific number of pixels that is smaller than the first specific number, to color data in a second color-related coordinate system;
   a gain calculation unit that calculates gain using the color data in the first coordinate system or the second coordinate system resulting from conversion performed by said conversion unit; and
   a gain adjustment unit that performs gain adjustment by applying said gain calculated by said gain calculation unit to the image data output by said image-capturing device for photographing.

17. An electronic camera according to claim 16, further comprising:
   a selection unit that selects either a first photographing mode suited to white balance adjustment performed by using an achromatic color or a second photographing mode suited to white balance adjustment performed by using skin color, wherein:
   said conversion unit converts said scene-analysis image data to color data in the first coordinate system or the second coordinate system in correspondence to the photographing mode selected by said selection unit.

18. An electronic camera according to claim 16, further comprising:
   a selection unit that selects, at least, a landscape photographing mode, wherein:
   if the landscape photographing mode has been selected by said selection unit, said conversion unit converts said scene-analysis image data to color data in the first coordinate system.

19. An electronic camera according to claim 16, further comprising:
   a selection unit that selects, at least, a portrait photographing mode, wherein:
   if said portrait photographing mode has been selected by said selection unit, said conversion unit converts said scene-analysis image data to color data in the second coordinate system.

20. An electronic camera comprising:
   an image-capturing device that captures an image of a subject image passing through a taking lens and outputs image data;
   a color temperature detection unit that is provided at a position conjugate with said image-capturing device relative to the taking lens and receives light of the subject image to detect color temperature information;
   a gain calculation unit that detects skin color based on the color temperature information detected by said color temperature detection unit for a predetermined area in a photographic field to calculate gain by using the skin color; and
   a gain adjustment unit that performs gain adjustment by applying said gain calculated at said gain calculation unit to the image data output by said image-capturing device.

21. An electronic camera according to claim 20, further comprising:
   a focal point detection unit that detects a focal adjustment state of the taking lens in a plurality of areas within the photographic field;
   a focal point detection area selection unit that selects a detection area in which detection is performed by said focal point detection unit among the plurality of areas; and
   a lens drive unit that drives the taking lens to a focus position based upon the focal adjustment state detected by said focal point detection unit, wherein:
   said gain calculation unit detects skin color based on the color temperature information detected by the color temperature detection unit for the detection area selected by said focal point detection area selection unit to calculate gain using the skin color.

22. An electronic camera according to claim 21, wherein:
   said gain calculation unit calculates gain by using the skin color detected at a point in time at which said lens drive unit completes the focal adjustment drive and said gain adjustment unit performs gain adjustment by applying the gain to the image data output by said image-capturing device.

23. An electronic camera according to claim 20, further comprising:
   a photometering unit that detects a brightness level of the subject image in a plurality of areas in the photographic field; and
   a photometering area selection unit that selects a photometering area where a photometering operation is to be performed by said photometering unit among the plurality of areas, wherein:
   said gain calculation unit detects skin color based on the color temperature information detected by said color temperature detection unit for the photometering area selected by said photometering area selection unit to calculate gain using the skin color.

24. An electronic camera according to claim 20, wherein:
   said gain calculation unit calculates gain based upon a predetermined color if the skin color cannot be detected.

* * * * *